United States Patent [19]

Bhargava et al.

[11] Patent Number: 5,855,019

[45] Date of Patent: *Dec. 29, 1998

[54] ENUMERATING PROJECTIONS IN SQL QUERIES CONTAINING OUTER AND FULL OUTER JOINS IN THE PRESENCE OF INNER JOINS

[75] Inventors: Gautam Bhargava, Cupertino; Piyush Goel, Monte Sereno; Balakrishna Raghavendra Iyer, San Jose, all of Calif.

[73] Assignee: International Business Machines Corporation, Armonk, N.Y.

[ * ] Notice: The term of this patent shall not extend beyond the expiration date of Pat. No. 5,687,362.

[21] Appl. No.: 904,172

[22] Filed: Jul. 31, 1997

Related U.S. Application Data

[63] Continuation of Ser. No. 379,891, Jan. 30, 1995, Pat. No. 5,687,362.

[51] Int. Cl.[6] ............................................. G06F 17/30
[52] U.S. Cl. .................................................... 707/9
[58] Field of Search ............................. 707/1, 2, 3, 4

[56] References Cited

U.S. PATENT DOCUMENTS

| | | | |
|---|---|---|---|
| 4,769,772 | 9/1988 | Dwyer | 707/2 |
| 4,829,427 | 5/1989 | Green | 707/4 |
| 5,091,852 | 2/1992 | Tsunchida et al. | 707/2 |
| 5,335,345 | 8/1994 | Frieder et al. | 707/4 |
| 5,367,675 | 11/1994 | Cheng et al. | 707/5 |
| 5,412,806 | 5/1995 | Du et al. | 707/2 |
| 5,495,605 | 2/1996 | Calot | 707/2 |

OTHER PUBLICATIONS

Date, C.J., "The Outer Join", Proceedings of the Second International Conference on Databases, Cambridge, England, Sep. 1983, pp. 76–106.

Dayal, U., et al., "An Extended Relational Algebra With Control Over Duplicate Elimination", Proc. ACM PODDS, pp. 117–123, 1982.

Dayal, Umeshwar, "Proceedings Queries with Quantifiers: A Horticultural Approach", Proc. ACM PODS, pp. 125–136, 1983.

Dayal, Umeshwar, "Of Nests and Trees: A Unified Appraoch to Processing Queries That Contain Nested Subqueries, Aggregates, and Quantifiers", VLDB, pp. 197–208, 1987.

Galindo–Legaria, C., and Rosenthal, A., "How to Extend a Conventional Optimizer to Handle One– and Two–Sided Outerjoin", IEEE Proceedings of Data Engineering, pp. 402–409, 1992.

Galindo–Legaria, C.A., "Algebraic Optimization of Outer-join Queries", PH.D. Dissertation, Center for Research in Computing Technology, Harvard University, Cambridge, MA, 1992.

(List continued on next page.)

*Primary Examiner*—Thomas G. Black
*Assistant Examiner*—Jack M. Choules
*Attorney, Agent, or Firm*—Gates & Cooper

[57] ABSTRACT

The present invention discloses a method and apparatus for the enumeration of projections (i.e., "SELECT DISTINCT" operations) in SQL queries containing outer and full outer joins in the presence of inner joins without encountering any regression in performance. The present invention removes projections from a given user query by moving the projections to the top of an expression tree representation of the query, wherein the projection removal is performed using algebraic identities rather than rule-based transformations. The present invention also discloses several methods of enumerating different plans or schedules for projection operations and binary operations in the given user query. The present invention can significantly reduce the execution time of a query by selecting the optimal schedule for binary operations and projections between the binary operations. However, the present invention ensures that there is no regression in performance by comparing the cost of the query with the cost of enumerated plans or schedules, thereby ensuring that the optimizations or transformations do not introduce performance penalties.

18 Claims, 24 Drawing Sheets

OTHER PUBLICATIONS

Pirahesh, H., et al., "Extensible/Rule Based Query Rewrite Optimization in Starbusrt", ACM SIGMOD, pp. 39–48, San Diego, CA, Jun. 1992.

Rosenthal, A. and Galindo–Legaria, C., "Query Graphs, Implementing Trees, and Freely–Reorderable Outerjoins", ACM SIGMOD, pp. 291–299, 1990.

Apers, P.M.G., et al., "Optimization Algorithms for Distributed Queries", IEEE Trans. Softw. Eng., SE–9, pp. 57–68, Jan. 1983.

Alon Levy, et al., "Query Optimization by Predicate Move–Around", Proceedings of the 20th VLDB Conference, Santiago, Chile, Sep. 1994.

Paulley, G.N. and Per–Ake Larson, "Exploiting Uniqueness in Query Optimization", CASCON, pp. 804–822, vol. II, Oct. 1993.

Lafortune, S. and Wong, E., "A State Transition Model for Distributed Query Processing", ACM Transactions on Database Systems, vol. II No. 3, pp. 294–322, Sep. 1986.

Lohman, G.M., et al., "Query Processing in R*", Res. Rep. RJ 4272, IBM Research Laboratory, San Jose, California, Apr. 1984.

Selinger, P.G., et al., "Access Path Selection in a Relational Database Management System", ACM SIGMOD, pp. 23–34, 1979.

Kim, Won, IBM Research "On Optimizing an SQL–Like Nested Query", ACM Transactions on Database Systems, vol. 7, No. 3, Sep. 1982, pp. 443–469.

Ganski et al., "Optimization of Nested SQL Queries Revisted", ACM, 1987, pp. 23–33.

Haas et al., "Extensible Query Processing in Starburst", IBM Almaden Research Center, San Jose, California (US), ACM 1989, pp. 377–388.

Date, C.J. and Darwen, Hugh, "Relationship Database Management", Relational Database Writings 1989–1991, Part II, pp. 133–154.

Ceri, Stephano, "Distributed Databases—Principles and Systems", McGraw Hill, 1984, pp. 93–172.

ENUMERATING PROJECTIONS IN SQL QUERIES CONTAINING OUTER AND FULL OUTER JOINS IN THE PRESENCE OF INNER JOINS

CROSS-REFERENCE TO RELATED APPLICATION

This application is a continuation of and commonly-assigned patent application Ser. No. 08/379,891, entitled "ENUMERATING PROJECTIONS IN SQL QUERIES CONTAINING OUTER AND FULL OUTER JOINS IN THE PRESENCE OF INNER JOINS," filed on Jan. 30, 1995, by Gautam Bhargava et al., U.S. Pat. No. 5,687,362, which application is incorporated by reference herein.

BACKGROUND OF THE INVENTION

1. Field of the Invention

This invention relates in general to database management systems performed by computers, and in particular, to a method and apparatus for the enumeration of projections (i.e., "SELECT DISTINCT" operations) in SQL queries containing outer and full outer joins in the presence of inner joins without introducing any regression in performance.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

The execution time of a SQL query can be reduced significantly by considering different schedules for the operations specified in the query. The current state-of-the-art in SQL query optimization provides techniques for optimizing queries that contain binary operations such as inner join, outer join and full outer join, as reflected in the following publications:

1. Galindo-Legaria, C., and Rosenthal, A., "How to Extend a Conventional Optimizer to Handle One- and Two-Sided Outerjoin," *Proceedings of Data Engineering*, pp. 402–409, 1992, (hereinafter referred to as "[GALI92a]");

2. Galindo-Legaria, C. A., "Algebraic optimization of outer join queries," *Ph.D. dissertation*, Dept. of Applied Science, Harvard University, Cambridge, 1992, (hereinafter referred to as "[GALI92b]");

3. Rosenthal, A. and Galindo-Legaria, C., "Query graphs, implementing trees, and freely-reorderable outer joins", *SIGMOD*, pp. 291–299, 1990, (hereinafter referred to as "[ROSE90]"); and 4. U.S. patent application Ser. No. 08/326,461, filed Oct. 20, 1994, by G. Bhargava, P. Goel, and B. Iyer, entitled "METHOD AND APPARATUS FOR REORDERING COMPLEX SQL QUERIES CONTAINING INNER AND OUTER JOIN OPERATIONS," now U.S. Pat. No. 5,680,603 (hereinafter referred to as "[BHAR94]").

In addition, the publication Dayal, Umeshwar, Goodman, N. and Katz, R. H., "An extended relational algebra with control over duplicate elimination", *Proc. ACM PODS*, pp. 117–123, 1982, (hereinafter referred to as "[DAYA82]"), presented an extended relational algebra to handle duplicates by either keeping the count of replication with each tuple or assigning a unique tuple identifier to each tuple.

Moreover, the publication Pirahesh, H., Hellerstein, J. M. and Hasan, W., "Extensible/Rule Based Query Rewrite Optimization in Starburst," *ACM SIGMOD*, pp. 39–48, San Diego, Calif., June 1992, (hereinafter referred to as "[PIRA92]"), employed tuple identifiers in their rule based query re-write system which removes projections specified between binary operations such as inner joins. This publication showed that the execution time of a query can be significantly improved by first removing projections and then generating the optimal plan for binary operations. This prior art technique transforms a given query into a new query in which binary operations are adjacent to each other, and then generates the optimal plan by considering different schedules for inner joins.

Notwithstanding the above, there are numerous problems with prior art techniques. While these prior art techniques can generate different schedules for binary operations, they generally do not consider different schedules for projections (i.e., SELECT DISTINCT operations in SQL). In addition, the prior art assumes that binary operations are adjacent to each other. However, since unary operators like selection and projection can appear any where in queries, binary operations may not be adjacent to each other. Moreover, since the cost of binary operations depend on the cardinalities of intermediate relations, it may be beneficial to remove the duplicates from intermediate relations.

Thus, there is a need in the art for techniques for removing projections from SQL queries, and for generating different schedules for SQL queries containing both projections and binary operations. Moreover, there is a need in the art for such techniques that do not introduce any regression in performance in the execution of such queries.

SUMMARY OF THE INVENTION

To overcome the limitations in the prior art described above, and to overcome other limitations that will become apparent upon reading and understanding the present specification, the present invention discloses a method and apparatus for the enumeration of projections (i.e., "SELECT DISTINCT" operations) and binary operations in SQL queries containing outer and full outer joins in the presence of inner joins without introducing any regression in performance.

An object of the present invention is to remove projections from a given user query by moving the projections to the top of an expression tree representation of the query. The projections are removed using algebraic identities rather than rule-based transformations.

Another object of the present invention is to enumerate different plans or schedules for projection operations and binary operations in the given user query.

Still another object of the present invention is to significantly reduce the execution time of a query by selecting an optimal schedule for binary operations and projections between the binary operations.

Yet another object of the present invention is to perform comprehensive reorderings of SQL queries and ensure that there is no regression in performance by comparing the cost of the original query with the cost of other schedules. This ensures that the optimizations or transformations do not introduce performance penalties.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
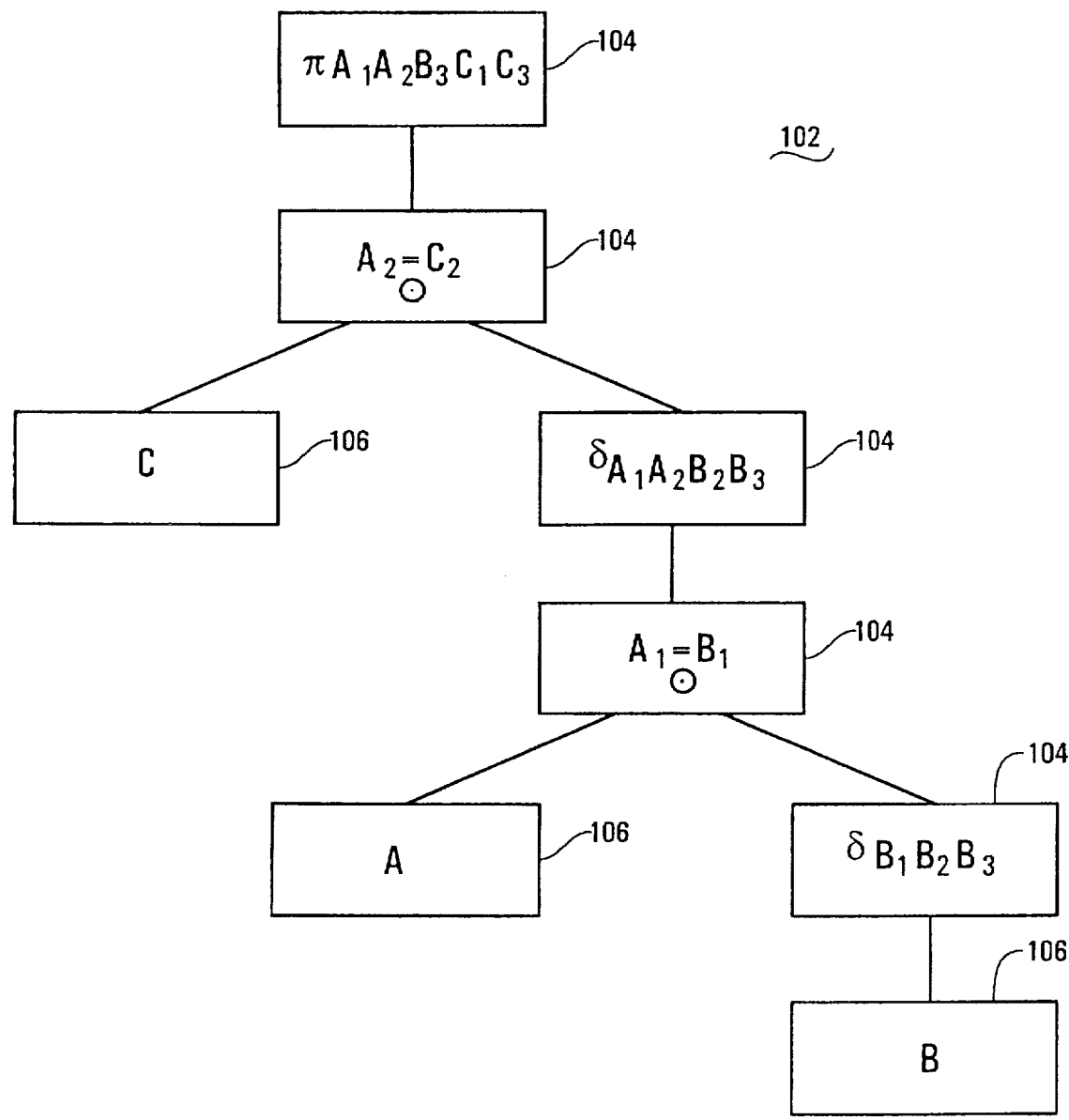
FIG. 1 illustrates an expression tree for an SQL query as generated by the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

The present invention discloses methods and apparatus for the enumeration of projections (i.e., "SELECT DISTINCT" operations) in SQL queries containing outer and full outer joins in the presence of inner joins without introducing any regression in performance. Using the present invention, the execution time of a query can be significantly reduced by selecting an optimal schedule for binary operations and intermediate projections.

The execution time of a SQL query can be reduced significantly by considering different schedules for the operations specified in the query. In the prior art, however, different schedules are not considered if a query contains projections along with binary operations. The present invention presents techniques that are capable of generating different schedules for projections and binary operations, without any regression in performance.

The prior art provides techniques for optimizing queries that contain binary operations, such as inner joins, outer joins and full outer joins. These techniques generate different schedules for the binary operations and do not consider different schedules for projections (i.e., the SELECT DISTINCT operations in SQL). These techniques also assume that binary operations are adjacent to each other in a tree representation of the query.

However, since unary operators like selection and projection can appear anywhere in queries, binary operations may not be adjacent to each other. Moreover, since the cost of binary operations depend on the cardinalities of intermediate relations, it may be beneficial to remove the duplicates from intermediate relations by scheduling intermediate projections.

The present invention addresses these issues. In a first aspect of the present invention, a method for moving projections in a given user query is disclosed. In a second aspect of the present invention, methods for generating different schedules for projections and binary operations are disclosed.

The present invention moves projections and generates different schedules for queries containing inner joins as well as outer joins. Furthermore, the present invention is based on algebraic identities and not on rule-based transformations.

With regard to the enumeration of projections, the present invention schedules cost beneficial projections between binary operations and enumerates different schedules for binary operations and projections. Note that if the optimizer only enumerates different schedules for binary operations and does not consider different schedules for projections, then the cost of expensive binary operations may increase further due to the duplicates in the intermediate relations. Furthermore, the present invention attempts to avoid scheduling an expensive final projection.

Both the results from [GALI92b] and the present invention require that selections be removed from a given query. This problem is addressed in [BHAR94], where a technique is provided to transform the given query into a new query in which selections are only applied to the base relations, wherein a selection predicate references at most one base relation and predicates that reference more than one relation are considered to be specified with binary operations. The selections specified in the query are moved past projections and binary operations. Henceforth, without loss of generalization, it is assumed that the given query only contains projections and binary operations.

DEFINITIONS

Following are definitions for a number of terms used in SQL queries. These definitions are required for an understanding of later portions of the present specification.

Tuple

A tuple t is a mapping from a finite set of attributes, $R \cup V$, to a set of atomic (possibly null) values, where R is a non-empty set of real attributes and V is a non-empty set of virtual attributes, $R \cap V = \emptyset$, and the mapping t maps at least one virtual attribute $v \in V$ to a non-null value. For an attribute set X, t[X] represents the values associated with attributes X under the mapping t, where $X \subseteq R \cup V$ and $X \neq \emptyset$.

The motivation behind the distinction between real and virtual attributes is to emphasize the difference between the real attributes available for manipulation (to the user of the RDBMS software) and the virtual attributes used (by the RDBMS software) for bookkeeping only. The set of real attributes of a tuple is the same as the schema of the tuple in the traditional relational algebra. These attributes are accessible to users and can be referenced externally, e.g., in user queries, etc. On the other hand, virtual attributes are (at times) used to provide unique conceptional tuple-ids to tuples, are not accessible to users, and cannot be referenced externally. When real attributes are not sufficient to identify tuples, virtual attributes are used to identify them.

Relation

A relation r is a triple (R, V, E) where R is a non-empty set of real attributes, V is a non-empty set of virtual attributes, and E, the extension of relation r, also denoted as ext(r), is a set of tuples such that:

$$(\forall t_1 \in E)(\forall t_2 \in E)(t_1 \neq t_2 \rightarrow t_1[V] \neq t_2[V])$$

In this definition, R∪V is called the schema of relation r, which is denoted as sch(r).

Predicate

A predicate p over a set of real attributes sch(p), called the schema of p, is a total mapping from tuples to the Boolean values {TRUE, FALSE}, where sch(p) is the minimum set of attributes such that for all tuples $t_1$ and $t_2$:

$$(t_1[sch(p)] = t_2[sch(p)]) \rightarrow p(t_1) = p(t_2)).$$

For a tuple t with real schema R⊇sch(p), p(t) is TRUE if and only if (∀A∈sch(p)) (i.e., substitution of t[A] for A in p causes it to evaluate to TRUE).

ALGEBRAIC OPERATORS

Following are definitions for algebraic operators used in SQL queries. These definitions are required for an understanding of later portions of the present specification.

Let r=(R, V, E), $r_1$=($R_1$, $V_1$, $E_1$) and $r_2$=($R_2$, $V_2$, $E_2$) denote relations such that $R_1 \cap R_2 = \emptyset$ and $V_1 \cap V_2 = \emptyset$.

Projection

The projection, $\pi^a_X(r)$, of relation r onto attributes X is the relation (X, V, E') where E'=ext(r), X⊆R and:

$$E'=\{t|(\exists t' \in E)(t[X]=t'[X] \wedge t[V]=t'[V])\}$$

The $\pi^a$ *operator is a projection operator that does not remove "duplicates" in the real attributes part of the source expression. The superscript a in $\pi^a$ denotes the fact that all the virtual attributes of the source expression are included in the virtual schema of the result expression.* For ease of reading, the superscript a is omitted from $\pi^a$ whenever there is no ambiguity, so it can be written simply as π.

The projection, $\pi^c_{X_R X_V}(r)$, of relation r on attributes $X_R X_V$ is the relation ($X_R$, $X_V$, E'), where $X_R \subseteq R$, $X_V \subseteq V$ and:

$$E'=\{t.v|(\exists t' \in E)(t=t'[X_R] \wedge v=t'[X_V])\}$$

In contrast to π, $\pi^c$ allows a choice in the selection of the virtual attributes from the source expression. This operation is needed for defining the "Modified Generalized Outer Join" operator defined hereinafter.

Delta-Projection

The delta-projection, $\delta_{X_R X_V}(r)$, of relation r on attributes $X_R X_V$ is the relation ($X_R X_V$, $V_{new}$, E'), where E'=ext(r), $X_R \subseteq R$, $X_V \subseteq V$, and:

$$E'=\{t|(\exists t' \in E)(t[X_R X_V]=t'[X_R X_V] \wedge t[V_{new}] \text{ is a new, unique value}\}$$

The δ operator models the "SELECT DISTINCT . . . " construct of SQL which allows elimination of duplicates from a relation. The δ operator is called the distinct projection operator and produces a result relation which has distinct values on the attributes $X_R X_V$ and a new virtual attribute.

Selection

The selection, $\sigma_p(r)$, of relation r on predicate p is the relation (R, V, E'), where sch(p)⊆R, and:

$$E'=\{t|(t \in E) \wedge p(t)\}$$

Additional Algebraic Operators

In the following definitions, it is assumed that if predicate p is associated with join/outer/full outer join of relations $r_1$ and $r_2$, then sch(p)∩$R_1 \neq \emptyset$, sch(p)∩$R_2 \neq \emptyset$, and sch(p) ⊆$R_1 \cup R_2$.

Outer Union

The outer union, $r_1 \uplus r_2$, is the relation ($R_1 \cup R_2$, $V_1 \cup V_2$, E'), where:

$$E'=\{t|(\exists t' \in E_1)(t[R_1]=t' \\ \wedge (\forall A \in (R_2-R_1))(t[A]=NULL)) \vee (\exists t'' \in E_2)(t[R_2]=t'' \wedge (\forall A \in (R_1-R_2))(t[A]=NULL))\}$$

Note that rows in $r_1 \uplus r_2$ are padded with nulls for those attributes that are not present either in relation $r_1$ or in relation $r_2$.

Join

The join, $r_1 \bowtie_p r_2$, of relations $r_1$ and $r_2$ is the relation ($R_1 R_2$, $V_1 V_2$, E'), where:

$$E'=\{t|t \in (E_1 \times E_2) \wedge p(t)\}$$

Left and Right Outer Joins

The left outer join, $r_1 \rightarrow^p r_2$, is the relation ($R_1 R_2$, $V_1 V_2$, E'), where:

$$E'=(E_1 \bowtie_p E_2) \uplus (E_1 - \pi^c_{R_1 V_1}(E_1 \bowtie_p E_2))$$

Relation $r_1$ in the above definition is called the preserved relation and relation $r_2$ is called the null supplying relation.

The right outer join, $r_1 \bowtie^p r_2$, can similarly be defined in which $r_1$ is the null supplying relation and $r_2$ is the preserved relation.

Full Outer join

The full outer join, $r_1 \bowtie^p r_2$, of relations $r_1$ and $r_2$ is the relation ($R_1 R_2$, $V_1 V_2$, E'), where:

$$E'=(E_1 \bowtie_p E_2) \uplus (E_1 - \pi^c_{R_1 V_1}(E_1 \bowtie_p E_2)) \uplus (E_2 - \pi^c_{R_2 V_2}(E_1 \bowtie_p E_2))$$

EXPRESSIONS AND EXPRESSION TREES

The following provides a recursive definition of expressions.

1. If r=(R, V, E) is a relation, then r is an expression. Henceforth, the shorthand notation X will be used to represent the expression X=($R_x$, $V_x$, $E_x$).

2. If X=($R_x$, $V_x$, $E_x$) is an expression, then $\pi^a_{X'}(X)$ is an expression, where X'⊆$R_x$.

3. If X=($R_x$, $V_x$, $E_x$) is an expression, then $\delta_{X_R X_V}(X)$ is an expression, where $X_R \subseteq R_x$ and $X_V \subseteq V_x$.

4. If X=($R_x$, $V_x$, $E_x$) is an expression, then $\sigma_p(X)$ is an expression, where sch(p)⊆$R_x$.

5. If X=($R_x$, $V_x$, $E_x$) and Y=($R_y$, $V_y$, $E_y$) are expressions, then X $\overset{p}{\underset{\beta}{\circ}}$ Y is an expression, where:

$$\overset{p}{\underset{\beta}{\circ}} \in \left\{ \overset{p}{\bowtie}, \overset{p}{\rightarrow}, \overset{p}{\leftarrow}, \overset{p}{\bowtie} \right\}$$

and p is a predicate such that sch(p)∩$R_x \neq \emptyset$, sch(p)∩$R_y \neq \emptyset$, and sch (p)⊆$R_x \cup R_y$.

6. If X=($R_x$, $V_x$, $E_x$) is an expression, then so is (X), where (X)=($R_x$, $V_x$, $E_x$). This is termed parenthesization, and is required due to the fact that some of the binary operations defined above are not fully associative. Parenthesization determines the evaluation order so that expressions can be evaluated unambiguously. However, whenever there is no ambiguity, parentheses will be dropped freely.

An expression can also be represented by a corresponding expression tree in which the inner nodes are the operators occurring in the expression and the leaves are the base relations referenced in the expression. Let $\overset{\circ}{B}$ denote one of the binary operators defined in the previous section, then an expression tree T with left subtree $T_l$, right sub-tree $T_r$ and root $\overset{\circ}{B}$ is denoted by:

$$(T_l \overset{\circ}{B} T_r)$$

Henceforth, the two equivalent representations are used interchangeably.

EXAMPLE

Consider the following query $Q_1$:

$$Q_1 = \pi_{A_1 A_2 B_3 C_1 C_3}\left(C^{A_2 = C_2}_{\underset{\circ}{\delta_{A_1 A_2 B_2 B_3}}}\left(A^{A_1 = B_1}_{\underset{\circ}{\delta_{B_1 B_2 B_3}(B)}}\right)\right)$$

wherein $\odot \in \{\bowtie, \leftarrow, \rightarrow, \leftrightarrow\}$, sch(A)={$A_i$}, sch(B)={$B_i$} and sch(C)={$C_i$} $1 \leq i \leq 3$. The expression tree 102 for $Q_1$ is illustrated in FIG. 1, and is comprised of inner nodes 104 that represent binary and unary operations, and outer nodes or leaves 106 that represent base relations.

HYPERGRAPHS AND ASSOCIATION TREES

A query is represented by hypergraph, defined as follows.
Hypergraph

A hypergraph G is defined to be the pair (V, E), where V is a non-empty set of nodes and E is the set of hyperedges, such that E is a mapping on non-empty subsets of V (i.e., $E:2^V \rightarrow 2^V$, wherein $2^V$ represents the power set of V)

As a notational convenience, for hyperedge $e=(V_1, V_2) \in E$, where $V_1, V_2 \in 2^V$, $V_1$ is referred to as sourceHypernode(e), and $V_2$ is referred to as destHypernode(e). Further, whenever there is no distinction required between $V_1$ and $V_2$, then they are simply called hypernodes. If $|V_1|=|V_2|=1$, hyperedge e is referred to as simply an edge and the hypernodes $V_1$ and $V_2$ as simply nodes.

A hypergraph is used to represent a query, where the set of nodes of the hypergraph correspond to relations referenced in the query, and edge represents a join (inner, one-sided outer, or full outer) operation involving a predicate between the 2 nodes of the edge, and a hyperedge represents an outer join (full or one-sided) between the sets of relations in its sourceHypernode and destHypernode. To clarify, edges correspond to predicates involving exactly two relations, whereas hyperedges correspond to outer join operations involving predicates that reference more than 2 relations.
Directed and Bi-directed (Hyper)edges A (hyper)edge is directed if it represents a one-sided outer join operation in the query. Further, a (hyper)edge is bi-directed if it represents a full outer join operation in the query.
Induced Subgraph A hypergraph G'=(V', E') is an induced subgraph of graph G=(V, E) if V'⊆V, E'⊆E and:

$$E'=\{e|e=(V_1, V_2) \in E, V_1 \subseteq V', V_2 \subseteq V'\}$$

An induced subgraph G'=(V', E') of G is denoted by G|$_{V'}$.

Association Tree

For a query hypergraph G=(V, E'), an association tree T is defined for G as a binary tree such that:

1. leaves(T)=V, and no relation appears in more than one leaf.
2. For any sub-tree T' of T, G|$_{leaves(T')}$ is connected where G|$_{leaves(T')}$ is the induced subgraph of G.
3. For any sub-tree T'=($T_l' \cdot T_r'$) of T, let $E_{T'}$ denote the set of all edges in E that connect leaves of $T_l'$ with leaves of $T_r'$, then either $V_1 \subseteq leaves(T_l)$ and $V_2 \subseteq leaves(T_r)$ or $V_2 \subseteq leaves(T_l)$ and $V_1 \subseteq leaves(T_r)$.

HARDWARE ENVIRONMENT

Figure 2:
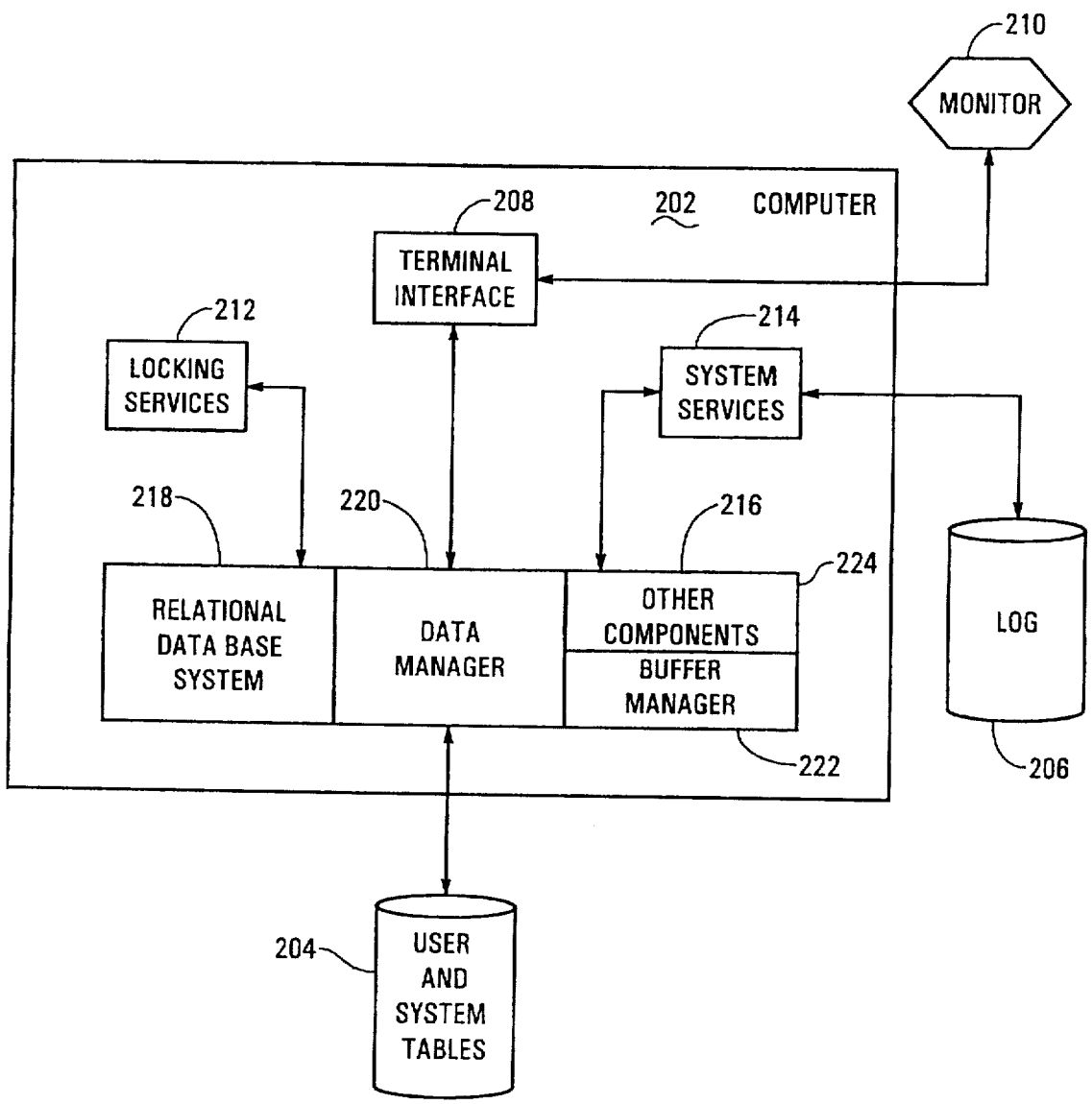
FIG. 2 illustrates the computer hardware environment of the present invention.

FIG. 2 illustrates an exemplary computer hardware environment that could be used with the present invention. In the exemplary environment, a computer system 202 is comprised of one or more processors connected to one or more electronic storage devices 204 and 206, such as disk drives, that store one or more relational databases.

Operators of the computer system 202 use a standard operator interface 208, such as IMS/DB/DC, CICS, TSO, OS/2 or other similar interface, to transmit electrical signals to and from a monitor 210 and the computer system 202 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL.

As illustrated in FIG. 2, the DB2 architecture includes three major components: the IMS Resource Lock Manager (IRLM) 212, the Systems Services module 214, and the Database Services module 216. The IRLM 212 handles locking services, because DB2 treats data as a shared resource, thereby allowing any number of users to access the same data simultaneously, and thus concurrency control is required to isolate users and to maintain data integrity. The Systems Services module 214 controls the overall DB2 execution environment, including managing log data sets 206, gathering statistics, handling startup and shutdown, and providing management support.

At the center of the DB2 architecture is the Database Services module 216. The Database Services module 216 contains several submodules, including the Relational Database System (RDS) 218, the Data Manager 220, the Buffer Manager 222 and other components 224 such as an SQL compiler/interpreter. These submodules support the functions of the SQL language, i.e., definition, access control, retrieval, and update of user and system data.

INTERACTIVE SQL EXECUTION

Figure 3:
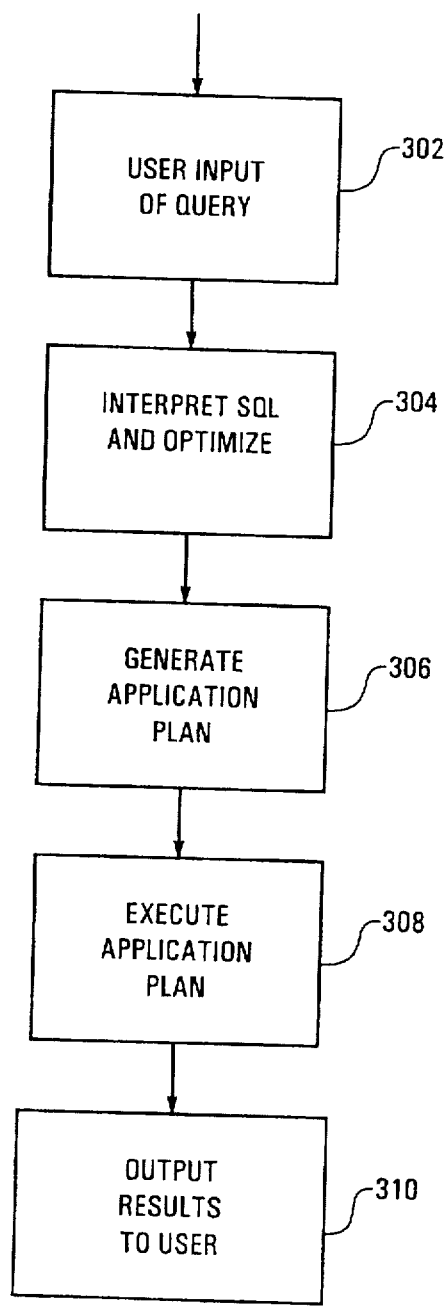
FIG. 3 is a flowchart illustrating the steps necessary for the interpretation and execution of SQL statements in an interactive environment according to the present invention.

FIG. 3 is a flowchart illustrating the steps necessary for the interpretation and execution of SQL statements in an interactive environment according to the present invention. Block 302 represents the input of SQL statements into the computer system 202 from the user. Block 304 represents the step of compiling or interpreting the SQL statements. An optimization function within block 304 may transform the SQL query in a manner described in more detail later in this specification. Block 306 represents the step of generating a compiled set of runtime structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 308 represents the execution of the application plan, and block 310 represents the output of the results of the application plan to the user.

EMBEDDED/BATCH SQL EXECUTION

Figure 4:
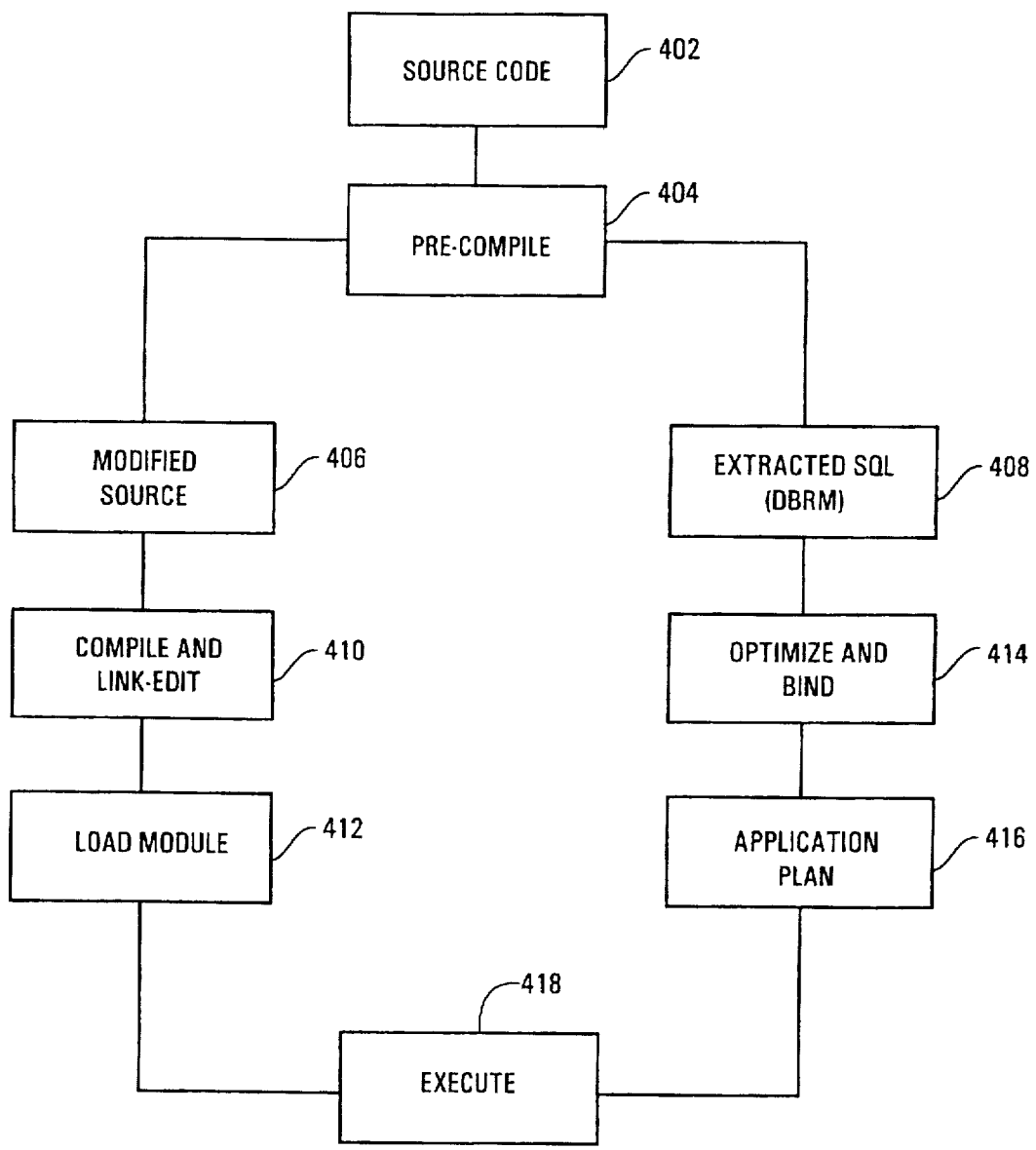
FIG. 4 is a flowchart illustrating the steps necessary for the interpretation and execution of SQL statements embedded in source code according to the present invention.

FIG. 4 is a flowchart illustrating the steps necessary for the interpretation and execution of SQL statements embedded in source code according to the present invention. Block 402 represents program source code containing a host language (such as COBOL or C) and embedded SQL statements. The program source code is then input to a pre-compile step 404. There are two outputs from the pre-compile step 404: a modified source module 406 and a Database Request Module (DBRM) 408. The modified source module 406 contains host language calls to DB2, which the pre-compile step 404 inserts in place of SQL statements. The DBRM 408 consists of the SQL statements from the program source code 402. A compile and link-edit step 410 uses the modified source module 406 to produce a load module 412, while an optimize and bind step 414 uses the DBRM 408 to produce a compiled set of runtime structures for the application plan 416. As indicated above in conjunction with FIG. 3, the SQL statements from the program source code 402 specify only the data that the user wants, but not how to get to it. The optimize and bind step 414 may reorder the SQL query in a manner described in more detail later in this specification. Thereafter, the optimize and bind step 414 considers both the available access paths (indexes, sequential reads, etc.) and system held statistics on the data to be accessed (the size of the table, the number of distinct values in a particular column, etc.), to choose what it considers to be the most efficient access path for the query. The load module 412 and application plan 416 are then executed together at step 418.

SQL QUERY OPTIMIZATION

Figure 5:
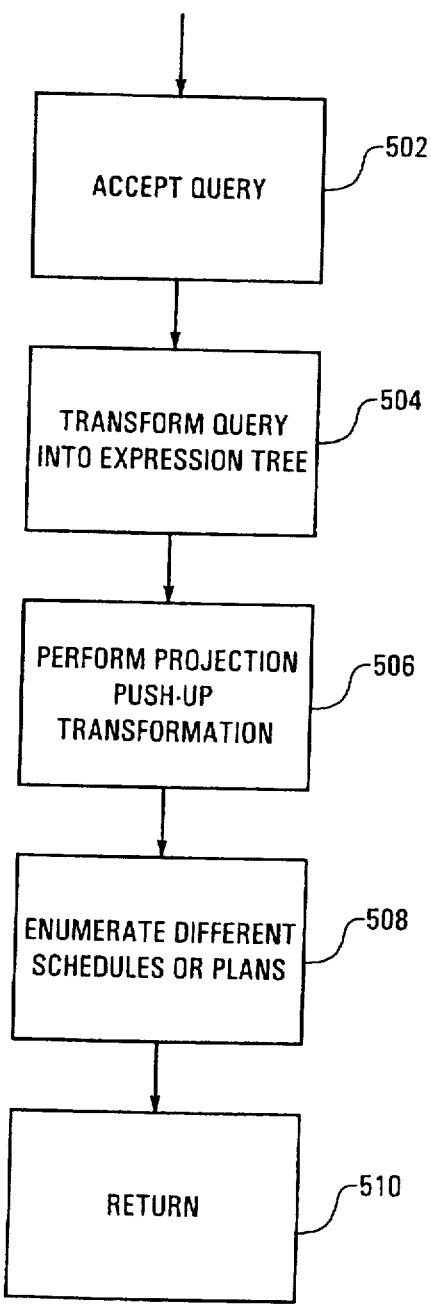
FIG. 5 is a flowchart illustrating the method of optimizing SQL queries of the present invention.

FIG. 5 is a flowchart illustrating the method of optimizing SQL queries in steps 304 of FIG. 3 and 414 of FIG. 4 according to the present invention. Block 502 represents the acceptance of the SQL query. Block 504 represents the translation of the query into a hypergraph-based expression tree, as described in more detail in FIG. 6. Block 506 represents the RDBMS software performing projection push-ups, as described in more detail in conjunction with FIGS. 7A–7D. Block 508 represents the RDBMS software enumerating different schedules for δ-projections and binary operations enumerating the projections, using either the ALL-NO-REGRESSION, HUERISTIC1-NO-REGRESSION or HUERISTIC2-NO-REGRESSION routines, as described in more detail in conjunction with FIGS. 8A–8D, 9A–9F, and 10A–10F, respectively. After these query transformation steps are performed, block 510 returns control to block 304 in FIG. 3 or block 414 in FIG. 4 for subsequent processing steps, including the execution of the SQL query against the relational database and the output of the result table to the user.

HYPERGRAPH TRANSLATION

Figure 6:
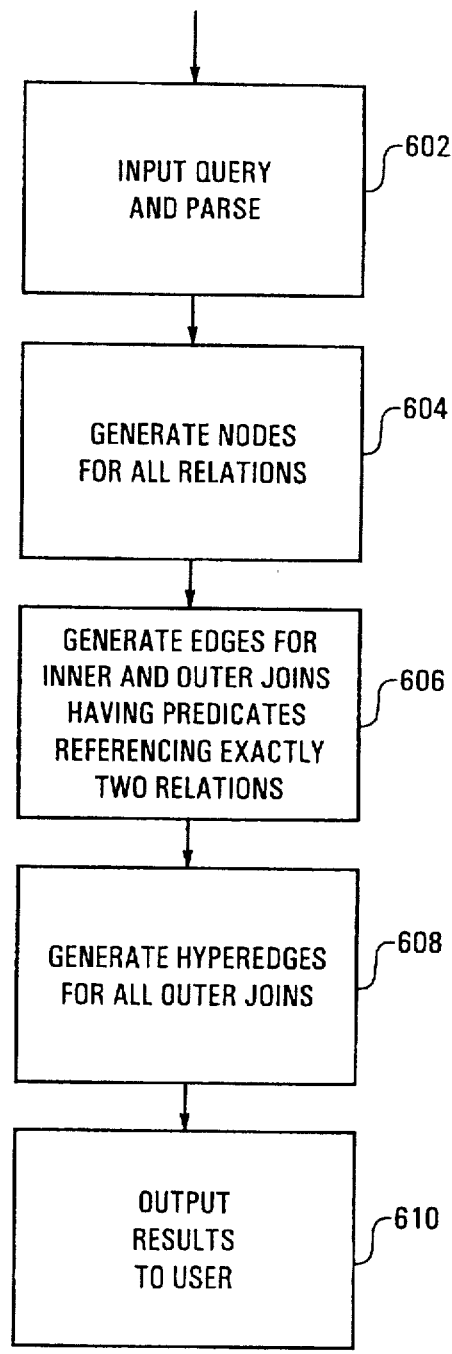
FIG. 6 is a flowchart illustrating a method of translating SQL queries into hypergraphs according to the present invention.

FIG. 6 is a flowchart illustrating the method of translating SQL queries into hypergraphs according to the present invention. Block 602 represents the input of the SQL query and the parsing of the query into its component parts. Block 604 represents the generation of a set of nodes corresponding to relations referenced in the query. Block 606 represents the generation of edges for all outer and inner joins in the query, wherein each edge is generated between two of the nodes corresponding to an outer or inner join operation involving a predicate between the two nodes. Block 606 also identifies an edge as being directed when it represents a one-sided outer join operation in the query. In addition, block 606 identifies an edge as being bi-directed when it represents a full outer join operation in the query. Block 608 represents the generation of hyperedges for all outer joins in the query, wherein each hyperedge is generated between two of the nodes corresponding to a left outer join, a right outer join, or a full outer join operation involving a predicate that references more than two relations in the query. Block 608 also identifies a hyperedge as being directed when it represents a one-sided outer join operation in the query. In addition, block 608 identifies a hyperedge as being bi-directed when it represents a full outer join operation in the query. Block 610 represents the output of the hypergraph for further processing.

PROJECTION PUSH-UP

FIGS. 7A–7D together are a flowchart illustrating a method of projection push-up for SQL queries according to the present invention. As noted earlier, [PIRA92] presented a rule-based scheme that can remove δ-projections specified between inner joins. The present invention discloses a different approach in order to remove δ-projections from a given query. The approach of the present invention employs a set of algebraic identities that include new identities for left/right outer joins and full outer joins. The present invention can also handle inner joins as well as outer and full outer joins. However, if the given query only contains inner joins, then the present invention and the scheme in [PIRA92] will generate the same transformed query.

Inputs

The input to the PROJECTION PUSH-UP routine is an expression tree T representing a given query and the output is a modified expression tree T* in which the top two nodes are either $(\pi\delta)$ or $(\pi\odot)$ or $(\delta\odot)$, where $\odot \in \{\bowtie, \leftarrow, \rightarrow, \leftarrow\rightarrow\}$. Note that the PROJECTION PUSH-UP routine assumes that the query simplification described in [BHAR94] has been applied to the given query. Furthermore, it assumes that output relations generated by left/right outer joins contain some attribute(s) from the null supplying side. That is, identity $\delta_{X_i}(e_x \rightarrow e_y) = \delta_{X_i}(e_x)$ has been applied to eliminate expression $e_y$, where $e_x = (X, V_x, \text{ext}(e_x))$ and $X_1 \subseteq X$. All other nodes are binary operators in the transformed tree T*.

The PROJECTION PUSH-UP method assumes that all selection operators have been eliminated from T by applying them to the base relations referenced in T. Consequently, the expression tree T contains only binary operators $\{\bowtie, \leftarrow, \rightarrow, \leftarrow\rightarrow\}$ and unary operators $\{\pi, \delta\}$.

Simplification Identities

Let $e_x = (X, V_x, \text{ext}(e_x))$ and $e_y = (Y, V_y, \text{ext}(e_y))$ denote two sub-expressions, $(\pi_{X_i})^*$ denote the sequence $\pi_{X_i} \pi_{X_{i-1}} \ldots \pi_{X_2} \pi_{X_1}$, $(\delta_{X_i})^*$, denote the sequence $\delta_{X_i} \delta_{X_{i-1}} \ldots \delta_{X_2} \delta_{X_1}$ and $(\pi_{X_i} \delta_{X_{i-1}})^*$, denote the sequence $\pi_{X_i} \delta_{X_{i-1}} \ldots \pi_{X_2} \delta_{X_1}$, where $X_{i+1} \subseteq X_i \subseteq X$ and $1 \leq i \leq (n-1)$. Further, let $\odot \in \{\bowtie, \leftarrow, \rightarrow, \leftarrow\rightarrow\}$.

The following identities are used in PROJECTION PUSH-UP routine. Whereas well known identities (1)–(7) prune redundant projection operations, identities (8)–(13) provide projection push-up rules:

$$(\pi_{X_n})^*(e_z) = \pi_{X_n}(e_z) \quad (1)$$

$$(\delta_{X_n})^*(e_z) = \delta_{X_n}(e_z) \quad (2)$$

$$\delta_{X_{n+1}}(\pi_{X_n})^*(e_z) = \delta_{X_{n+1}}(e_z), X_{n+1} \subseteq X_n \quad (3)$$

$$\pi_{X_{n+1}}(\delta_{X_n})^*(e_z) = \pi_{X_{n+1}}\delta_{X_n}(e_z), X_{n+1} \subseteq X_n \quad (4)$$

$$(\pi_{X_n}\delta_{X_{n-1}})^*(e_z) = \pi_{X_n}\delta_{X_{n-1}}(e_z) \quad (5)$$

$$\delta_{X_{n+1}}(\pi_{X_n}\delta_{X_{n-1}})^*(e_z) = \delta_{X_{n+1}}(e_z), X_{n+1} \subseteq X_n \quad (6)$$

$$\pi_{X_{n+1}}(\pi_{X_n}\delta_{X_n})^*(e_z) = \pi_{X_{n+1}}\delta_{X_n}(e_z), X_{n+1} \subseteq X_n \quad (7)$$

$$\pi_{X_1}(e_z) \odot \pi_{Y_1}(e_y) = \pi_{X_1 Y_1}(e_z \odot e_y) \quad (8)$$

$$\delta_{X_1}(e_z) \odot \delta_{Y_1}(e_y) = \delta_{X_1 Y_1}(e_z \odot e_y) \quad (9)$$

$$\pi_{X_2}\delta_{X_1}(e_z) \odot \pi_{Y_2}\delta_{Y_1}(e_y) = \pi_{X_2 Y_2}\delta_{X_1 Y_1}(e_z \odot e_y) \quad (10)$$

$$\pi_{X_1}(e_z) \odot \delta_{Y_1}(e_y) = \pi_{X_1 Y_1}\delta_{V_{X_1} Y_1}(e_z \odot e_y) \quad (11)$$

$$\pi_{X_2}\delta_{X_1}(e_z) \odot \pi_{Y_1}(e_y) = \pi_{X_2 Y_1}\delta_{V_{X_1} Y_1}(e_z \odot e_y) \quad (12)$$

$$\pi_{X_2}\delta_{X_1}(e_z) \odot \delta_{Y_1}(e_y) = \pi_{X_2 Y_1}\delta_{X_1 Y_1}(e_z \odot e_y) \quad (13)$$

Note that the above identities are new for one-sided outer join operators and full outer join operators.

Notation (a) The PROJECTION PUSH-UP routine is also referred to as the PUSH-UP routine as an abbreviation.

(b) If $T_s$ is a (sub)tree, then the root node of the (sub)tree is denoted as by $\odot_r$ and/or root $(T_s)$.

(c) If $\odot$ is a unary node in a (sub)tree, then the child of $\odot$ is denoted by uChild($\odot$).

(d) If $\odot$ is a unary node, and $T_s$ is a (sub)tree, then the notation $\odot \cdot T_s$ is used to denote the (sub)tree in which root$(T_s)$ is uChild($\odot$).

Flowchart

Figure 7A:
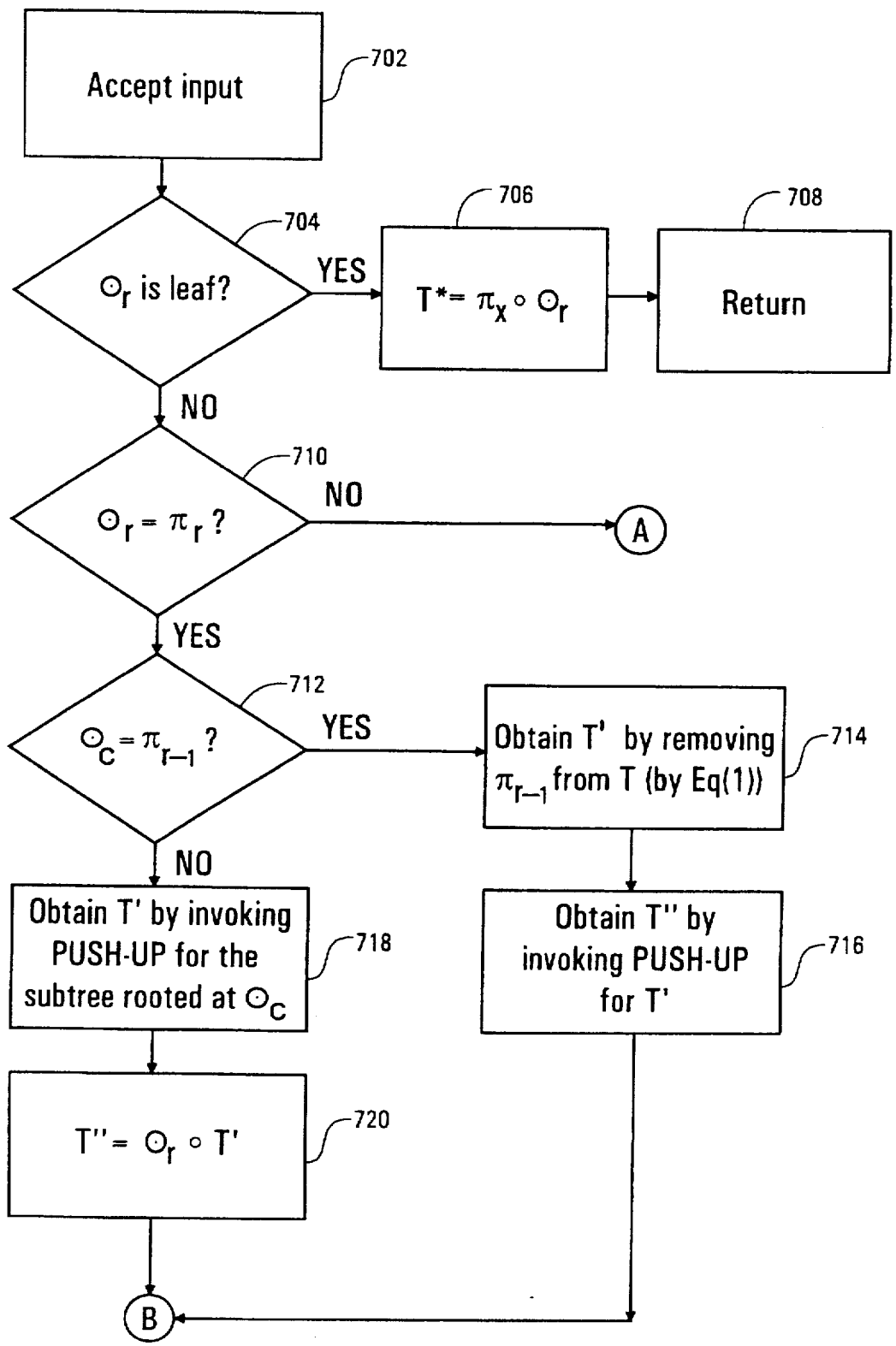
FIGS. 7A–7D together are a flowchart illustrating a method of projection push-up for SQL queries according to the present invention.

Referring to FIG. 7A, block 702 accepts the input into the PROJECTION PUSH-UP routine, wherein the input comprises an expression tree T containing unary operators $\{\delta, \pi\}$ and binary operators $\{\bowtie, \leftarrow, \rightarrow, \leftrightarrow\}$. The output is the modified tree T*.

Block 704 is a decision block that determines whether $\odot_r$ is a leaf, i.e., a base relation with schema X. If so, control is transferred to block 706, which sets $T^* = \pi_{X} \cdot \odot_r$, and block 708, which returns control to the calling routine. Otherwise, control is transferred to block 710.

Block 710 is a decision block that determines whether $\odot_r = \pi_r$ and $\odot_c$ is its child. If not, then control is transferred to "A" in FIG. 7B. Otherwise, control is transferred to block 712.

Block 712 is a decision block that determines whether $\odot_c = \pi_{r-1}$. If so, then control is transferred to block 714, which obtains T' by removing $\pi_{r-1}$ from T (by Equation (1) above), and then to block 716, which obtains T" by a recursive invocation of the PROJECTION PUSH-UP routine for T'. Otherwise, control is transferred to block 718, which obtains T' by a recursive invocation of the PROJECTION PUSH-UP routine for the subtree rooted at $\odot_c$, and to block 720, which sets $T'' = \odot_r \cdot T'$. Thereafter, control is transferred to "B" in FIG. 7B.

Figure 7B:
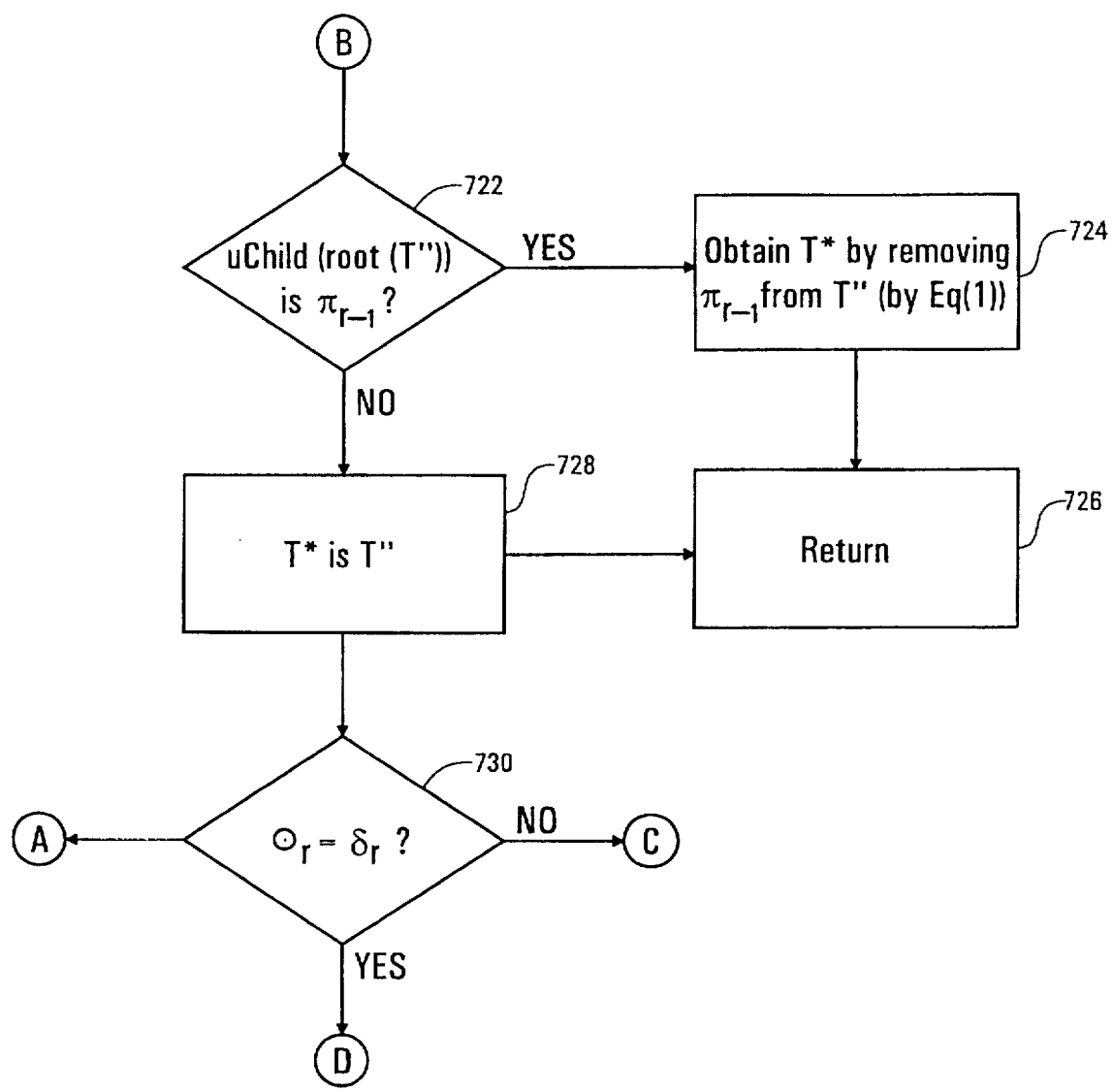

Referring now to FIG. 7B, block 722 is a decision block that determines whether uChild(root(T")) is $\pi_{r-1}$. If so, then block 724 obtains a modified expression tree T* by removing $\pi_{r-1}$ from T" (by Equation (1) above), and block 726 returns to the calling routine. Otherwise, block 728 sets T* to T", and block 726 returns to the calling routine.

Also in FIG. 7B, block 730 is a decision block that determines whether $\odot_r = \delta_r$ and $\odot_c$ is its child. If not, then control is transferred to "C" in FIG. 7D. Otherwise, control is transferred to "D" in FIG. 7C.

Figure 7C:
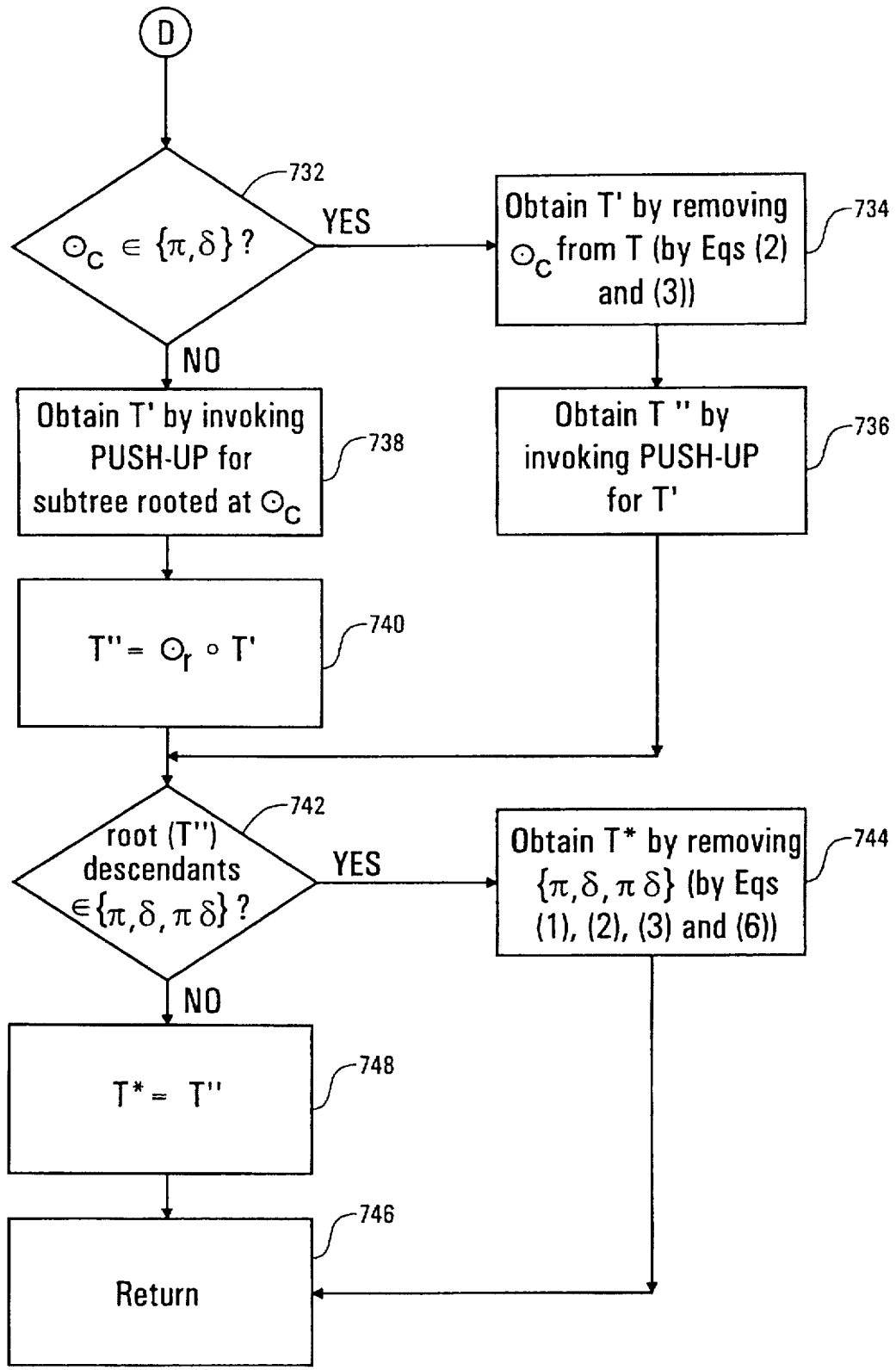

Referring now to FIG. 7C, block 732 is a decision block that determines whether $\odot_c \in \{\pi, \delta\}$. If so, then control is transferred to block 734, which obtains T' by removing $\odot_c$ from T (by Equations (2) and (3) above), and to block 736, which obtains T" by a recursive invocation of the PROJECTION PUSH-UP routine for T'. Otherwise, control is transferred to block 738, which obtains T' by a recursive invocation of the PROJECTION PUSH-UP routine for the subtree rooted at $\odot_c$, and block 740, which sets $T'' = \odot_r \cdot T'$. Thereafter, control is transferred to block 742.

Block 742 is a decision block that considers the sequence of unary descendants of root(T"), and then determines whether this sequence of unary descendants $\in \{\pi, \delta, \pi\delta\}$. If so, the control is transferred to block 744, which obtains the modified expression tree T* by removing the sequence of nodes (by Equations (2), (3), and (6) above) and block 746, which returns to the calling routine. Otherwise, control is transferred to block 738, which sets T* to T", and block 736, which returns to the calling routine.

Figure 7D:
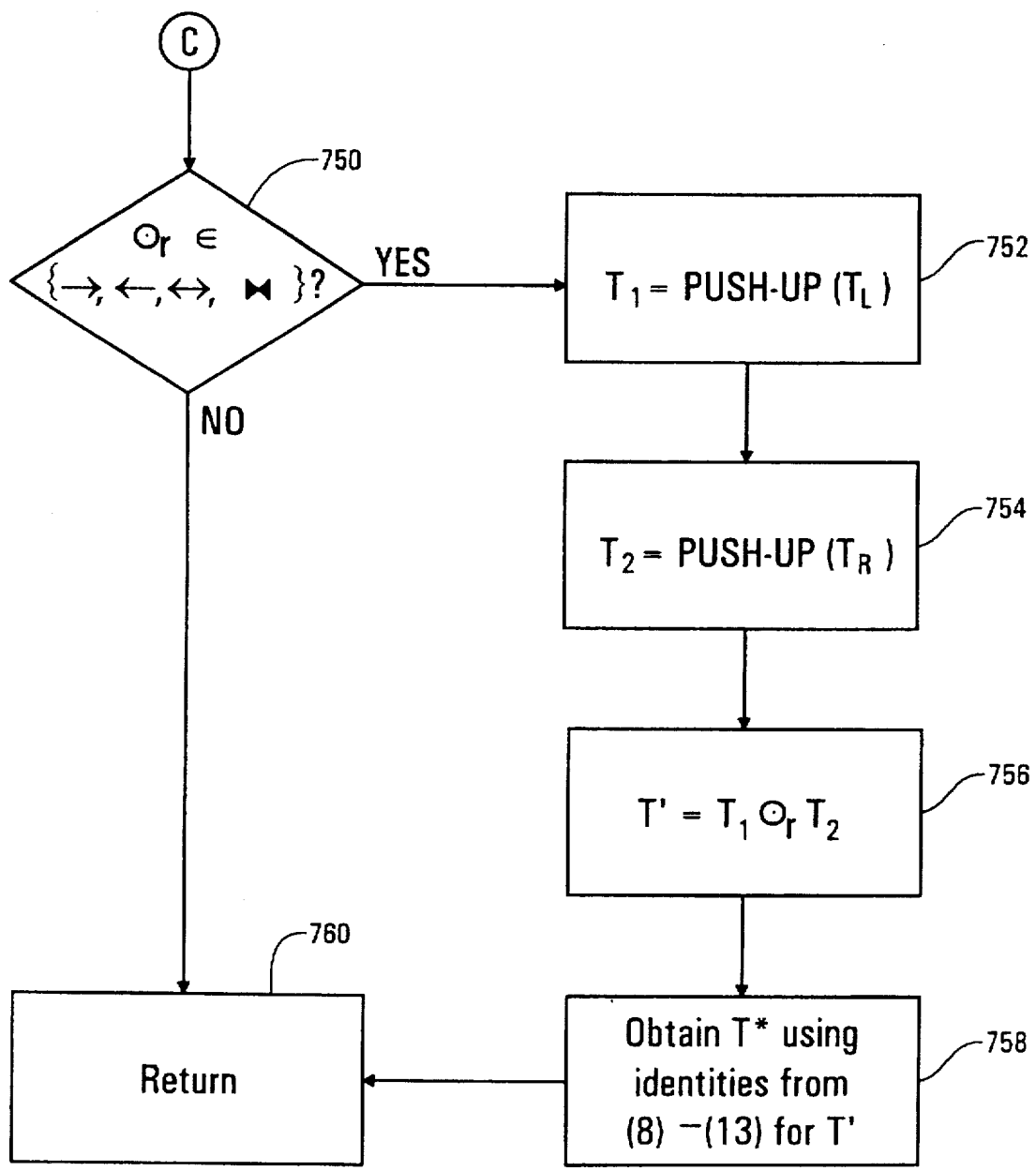

Referring now to FIG. 7D, block 750 is a decision block that determines whether $\odot_r \in \{\bowtie, \leftarrow, \rightarrow, \leftrightarrow\}$. If so, then control is transferred to block 752, which obtains $T_1$ by a recursive invocation of the PROJECTION PUSH-UP routine for the left subtree $T_L$ of T, to block 754, which obtains $T_2$ by a recursive invocation of the PROJECTION PUSH-UP routine for the right subtree $T_R$ of T, and block 756, which obtains $T' = T_1 \odot T_2$. Now, T' has a form similar to the left hand side of one of the identities in Equations (8)–(13) above. Then, block 758 obtains T* using the corresponding identity. Finally, block 760 terminates the PROJECTION PUSH-UP routine, outputs a modified expression tree T*, and returns control to the calling routine.

ENUMERATING PLANS WITH NO REGRESSION

The cost of executing a query can be reduced significantly by selecting a plan in which $\delta$-projections and binary operations are scheduled appropriately. In this section, ALL-NO-REGRESSION, HUERISTIC1-NO-REGRESSION and HUERISTIC2-NO-REGRESSION routines are presented that enumerate different schedules for $\delta$-projections and binary operations in conjunction with FIGS. 8A–8D, 9A–9D and 10A–10D, respectively. These routines generate different schedules for the expression tree returned by the PROJECTION PUSH-UP routine. Also, these routines ensure that there is no regression in performance by always enumerating a plan in which binary operations and projections appear in the same order as in the original query.

ALL ASSOCIATION TREES WITH NO REGRESSION

FIGS. 8A–8D together are a flowchart illustrating a method of generating all association trees for SQL queries with no regression according to the present invention. The ALL-NO-REGRESSION method performs an exhaustive enumeration of all the possible plans for a query containing projections and binary operations. These plans are constructed bottom up, incrementally, from the hypergraph of the query. In the ALL-NO-REGRESSION method, at each step, two subtrees are combined to obtain a new tree, say T, provided all the conditions specified in the definition of association tree are satisfied. Whenever possible, an additional tree, say $T_{new}$ is generated from tree T by scheduling a $\delta$-projection at the root of T. If tree T contains a relation whose virtual id is not in the schema of the expression tree returned by PROJECTION PUSH-UP routine, then tree T is used to generate one more tree. The additional tree is generated by scheduling a projection at the root of tree T. Although not mentioned here, dynamic programming can be used to prune the space of alternatives. Also, the method proposed in [BHAR94] can assign operators to the interior nodes of these association trees.

Notation $T^* = (R_{T^*}, V_{T^*}, ext(T^*))$ is an expression tree returned by the PROJECTION PUSH-UP routine.

$T^*$ is either $\pi_{R_{T^*}}(T')$ or $\pi_{R_{T^*}}\delta^{T^*}(T')$ or $\delta^{T^*}(T')$.

$\delta^{T^*}$ is a $\delta$-projection at the top of $T^*$.

$sch(\delta^{T^*})$ is a set containing real and virtual attributes from one or more base relations in $T^*$, such that if $T^* = \pi_{R_{T^*}}(T')$, then $sch(\delta^{T^*}) = \emptyset$.

$T = T_l \cdot T_r$ is an association tree of $G|_{leaves(T)}$, where $T_l$ and $T_r$ are left and right subtrees of T, respectively.

$T = (R_T, V_T, ext(T))$.

$E_T$ is a set of hyperedges in G that connect leaves of $T_l$ with leaves of $T_r$.

e is a hyperedge in E.

$J_T = \{A | A \in R_T$ and A is referenced by $e \in (E - E_T)\}$.

Flowchart

Figure 8A:
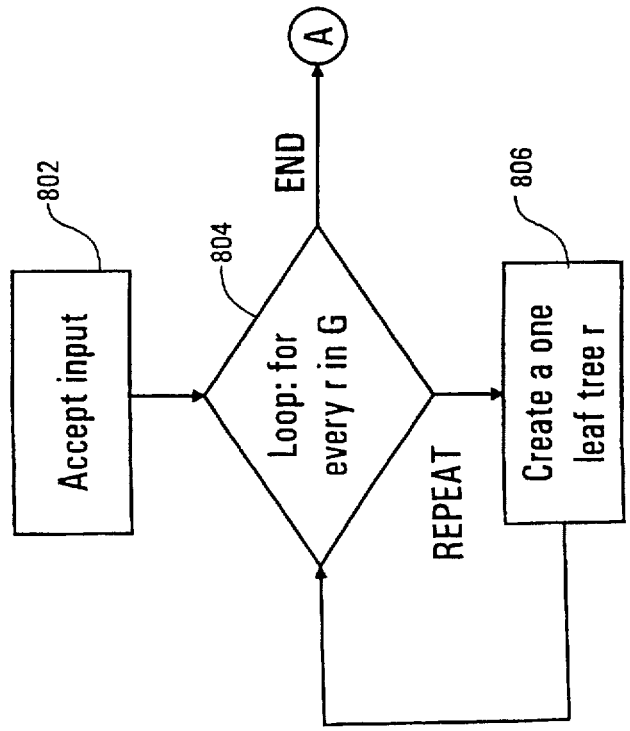
FIGS. 8A–8D together are a flowchart illustrating a method of generating all association trees for SQL queries with no regression according to the present invention.

Referring to FIG. 8A, block 802 accepts the input into the routine, comprising an expression tree represented as a query graph G=(V, E).

Block 804 is a decision block that represents a sequential "for" loop that is executed once for each relation r referenced in G. Block 804 transfers control to block 806 as the first step of the loop for each relation. Otherwise, at the end of the loop, control transfers to "A" in FIG. 8B after all the relations have been processed.

Block 806 creates a one leaf tree r. Thereafter, control is returned to block 804 to complete the loop.

Figure 8B:
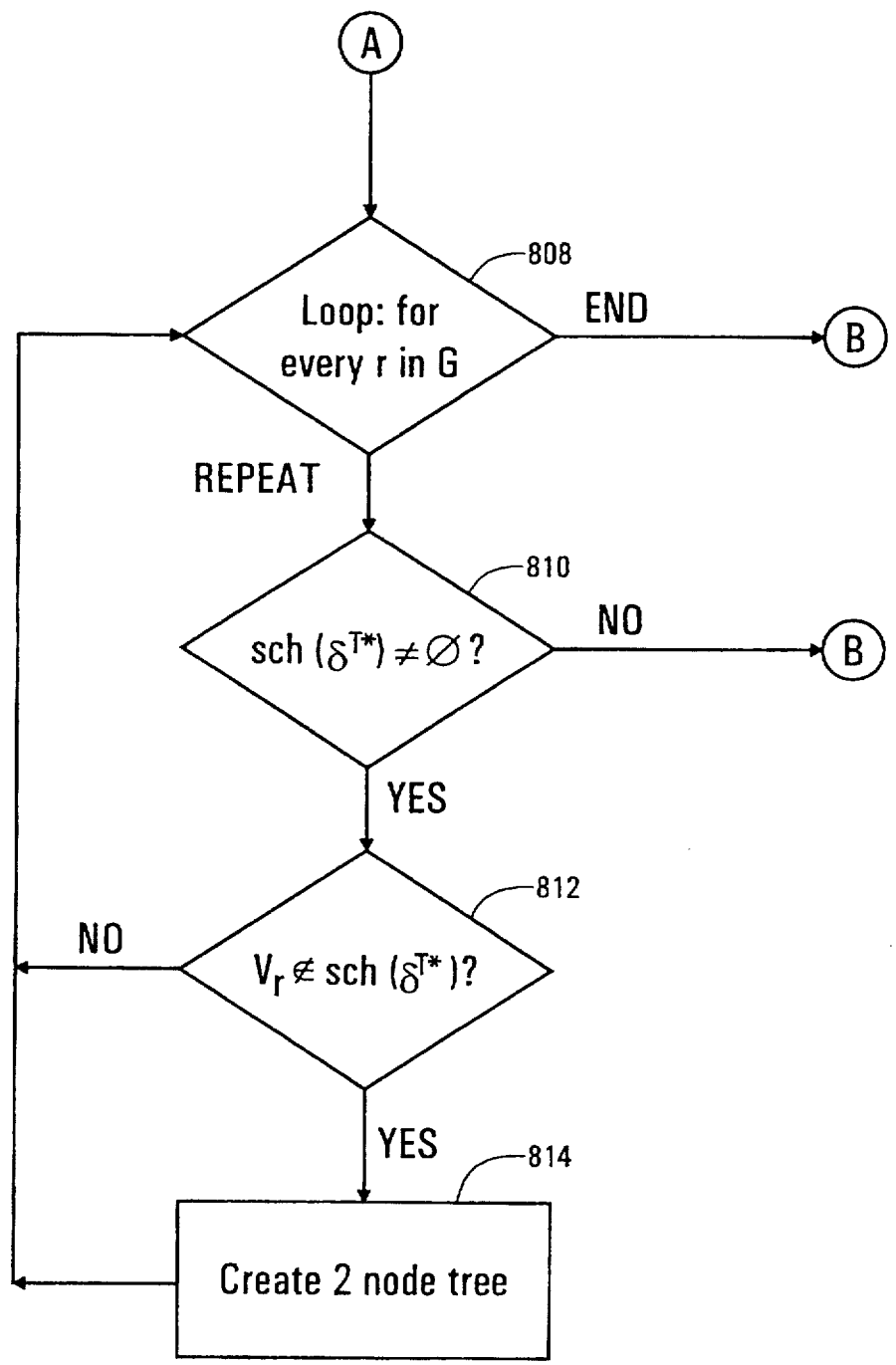

Referring now to FIG. 8B, block 808 is a decision block that represents a sequential "for" loop that is executed once for each relation r referenced in G. Block 808 transfers control to block 810 as the first step of the loop for each relation. Otherwise, at the end of the loop, control transfers to "B" in FIG. 8C after all the relations have been processed.

Block 810 is a decision block that determines whether $sch(\delta^{T^*}) \neq \emptyset$. If not, then control transfers to "B" in FIG. 8C. Otherwise, control is transferred to block 812.

Block 812 is a decision block that determines whether, for each relation r referenced in G, $V_r \notin sch(\delta^{T^*})$. If not, then control is returned to block 808 to complete the loop. Otherwise, control is transferred to block 814.

Block 814 creates a two node tree comprising $\delta_{sch(r) \cap sch(\delta^{T^*}) \cup V_r}(r)$. Thereafter, control is returned to block 808 to complete the loop.

Figure 8C:
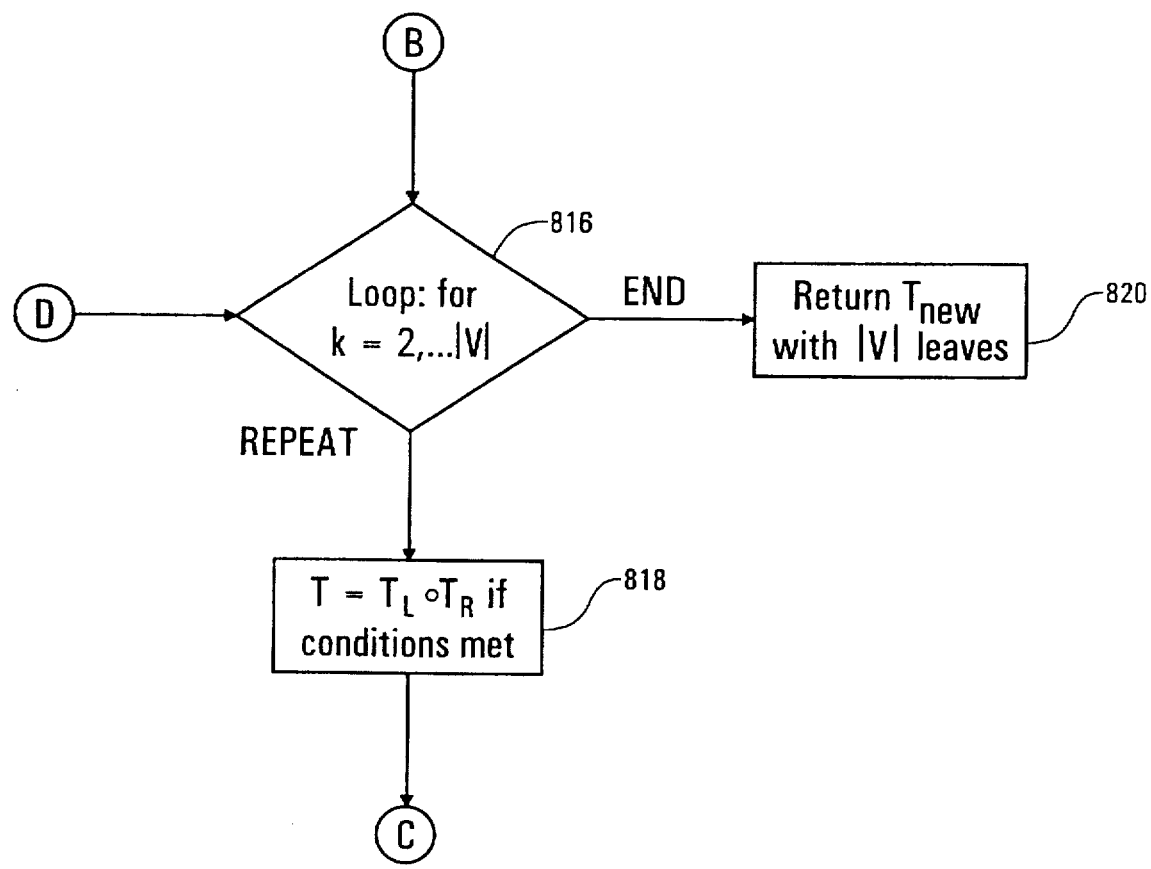

Referring now to FIG. 8C, block 816 is a decision block that represents a sequential "for" loop that is executed once for each k=2,3, ..., |V|, where |V| denotes the cardinality of the set V. Block 816 transfers control to block 818 as the first step of the loop for each iteration. Otherwise, control transfers to block 820 after the loop is completed, which terminates the ALL-NO-REGRESSION routine, returns as its output all $T_{new}$ trees with |V| leaves (i.e., all possible association trees for G), and returns control to the calling routine.

Block 818 combines subtrees $T_l$ and $T_r$ to form $T = T_l \cdot T_r$, provided certain conditions are met. These conditions include the following:

leaves($T_l$) $\cap$ leaves($T_r$) = $\emptyset$.

|leaves($T_l$)| + |leaves($T_r$)| = k.

$G|_{leaves(T_l) \cup leaves(T_r)}$ is connected.

$\forall e = (V_1, V_2) \in E_T$, either $V_1 \subseteq leaves(T_l)$ and $V_2 \subseteq leaves(T_r)$ or $V_2 \subseteq leaves(T_l)$ and $V_1 \subseteq leaves(T_r)$.

Figure 8D:
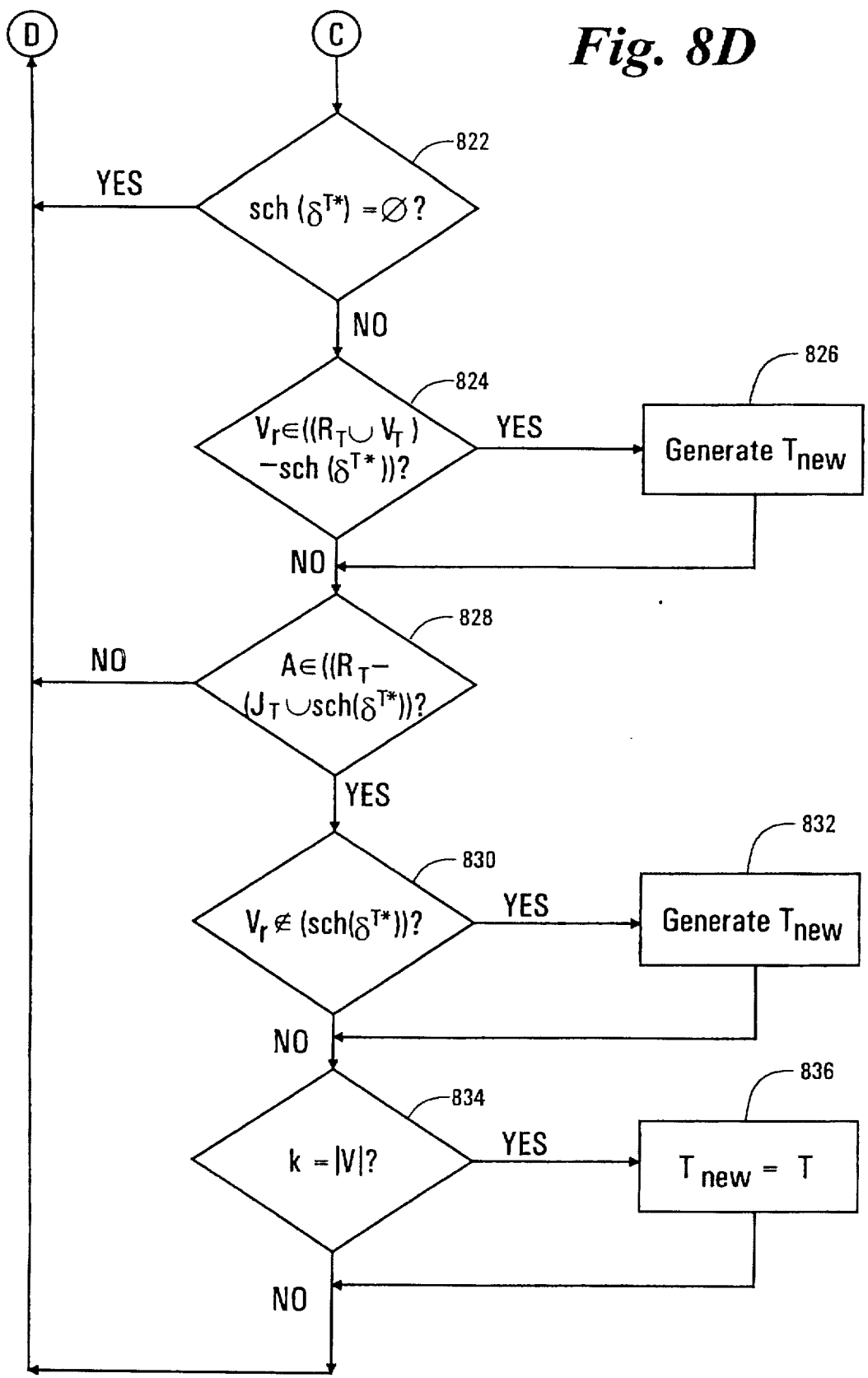

Thereafter, control is transferred to "C" in FIG. 8D.

Referring now to FIG. 8D, block 822 is a decision block that determines whether $sch(\delta^{T^*}) \neq \emptyset$. If so, then control is transferred to "D" in FIG. 8C, which returns to block 816 to complete the loop. Otherwise, control is transferred to block 824.

Block 824 is a decision block that determines whether the virtual attribute $V_r$ of any base relation r is in the set $((R_T \cup V_T) - sch(\delta^{T^*}))$. If so, then control is transferred to block 826, which generates $T_{new} = \delta_{J_T \cup V_T \cup R_T \cap sch(\delta^{T^*})}(T)$. Otherwise, control is transferred to block 828.

Block 828 is a decision block that determines whether the real attribute A of base relation r is in the set $(R_T - (J_T \cup sch(\delta^{T^*})))$. If not, then control is transferred to "D" in FIG. 8C, which returns to block 816 to complete the loop. Otherwise, control is transferred to block 830.

Block 830 is a decision block that determines whether $V_r \notin sch(\delta^{T^*})$. If so, then control is transferred to block 832, which generates $T_{new} = \delta_{J_T \cup V_T \cup R_T \cap sch(\delta^{T^*})}(T)$. Otherwise, control is transferred to block 834.

Block 834 is a decision block that determines whether k=|V|. If so, then control is transferred to block 836, which sets $T_{new} = T$. Thereafter, control is transferred to "D" in FIG. 8C, which returns to block 816 to complete the loop.

EXAMPLE

Consider query $Q_1$ in FIG. 1. The PROJECTION PUSH-UP routine transforms $Q_1$ into the following expression:

$$T^* = \pi_{A_1 A_2 B_3 C_1 C_3} \delta_{A_1 A_2 B_2 B_3 C_1 C_2 C_3} V_C \left( C \overset{A_2 = C_2}{\underset{\circ}{\bowtie}} A \overset{A_1 = B_1}{\underset{\circ}{\bowtie}} B \right)$$

Table 1 illustrates the different schedules generated by the ALL-NO-REGRESSION method for query $Q_1$. Note that the sequence of transitions between intermediate states A, $\delta_{B_1 B_2 B_3}(B)$, C, $T_4$ and $T_5$ leads to final state $T_{17}$, which contains projections and binary operations in the same order as specified in the original query $Q_1$.

HUERISTIC METHOD #1 WITH NO REGRESSION

FIGS. 9A–9F together are a flowchart illustrating a method of generating association trees for SQL queries heuristically with no regression according to the present invention. The worst case time complexity of the ALL-NO-REGRESSION routine is exponential even for those queries that only contain joins. If both joins and projections are present, then the complexity further increases exponentially. Thus, it may not be feasible to enumerate all possible schedules for a given query that contains a large number of projections and joins. Furthermore, the ALL-NO-REGRESSION routine may generate final plans that contain a large number of projections in them.

The HUERISTIC1-NO-REGRESSION routine is presented, which generates a smaller state space than the ALL-NO-REGRESSION method. It generates all possible schedules for joins (as done in DB2/MVS) and considers only a limited number of schedules for $\delta$-projections.

First, the following identity is applied to push down projections in a given query Q:

$$\delta_{X_1 Y_1}\left(e_x \overset{p_{xy}}{\underset{\circ}{\bowtie}} e_y\right) = \delta_{X_1}(e_x) \overset{p_{xy}}{\underset{\circ}{\bowtie}} \delta_{Y_1}(e_y) \quad (14)$$

where $e_x=(X, V_x, \text{ext}(e_x))$, $e_y=(Y, V_y, \text{ext}(e_y))$, $X_1 \subseteq X$, $Y_1 \subseteq Y$. $(\text{sch}(p_{xy}) \cap X) \subseteq X_1$ and $(\text{sch}(p_{xy}) \cap Y) \subseteq Y_1$. Note, that it is assumed that query Q does not contain unnecessary δ-projections. That is, if the original query contains sub-expression $(\delta_{X_n})^*(e_x)$ then it has been simplified to $\delta_{X_n}(e_x)$ in query Q.

Identity (14) is applied recursively in order to push down δ-projections as far as possible. After pushing down δ-projections in Q, the following PROJECTION-SET is generated from the transformed query: PROJECTION-SET $(Q')=\{X|\delta_X \text{ is a projection in } Q'\}$, where $Q'$ is obtained from Q by recursively applying identity (14). The PROJECTION-SET($Q'$) contains δ-projections specified in query $Q'$. For every δ-projection in $Q'$, a set containing all those base relations is constructed that are contained in the subtree rooted with the δ-projection. These sets are termed REQUIRED-SETS.

The required set($\delta_X$) of projection $\delta_X$, where $\delta_X(e_x)$ is a sub-expression in $Q'$, is the following set: REQUIRED-SET $(\delta_X)=\{R|R \text{ is a base relation referenced in } e_x\}$.

Intuitively, the REQUIRED-SET($\delta_X$) of projection $\delta_X$ contains all those relations that must be present in a subtree before projection $\delta_X$ can be scheduled at the root of the subtree. Next, the projections in query $Q'$ are removed by applying the PROJECTION PUSH-UP routine to $Q'$. The expression tree returned by the PROJECTION PUSH-UP routine, PROJECTION-SET($Q'$) and REQUIRED-SETs are the inputs to the HUERISTIC1-NO-REGRESSION routine which generates different plans for the original query by generating different plans for the expression tree returned by the PROJECTION PUSH-UP routine. Similar to the ALL-NO-REGRESSION routine, these plans are constructed incrementally from the bottom up. A new tree is generated by combining two sub-plans. If elements of PROJECTION-SET($Q'$) contain attributes such that the corresponding required sets are subsets of the newly generated tree, then an additional tree is generated. The additional tree is generated by scheduling a projection at the top of the newly generated tree.

Notation

T* is an expression tree returned by the PROJECTION PUSH-UP routine.

T* is either $\pi_{R_T}(T)$ or $\pi_{R_T}\delta^{T^*}(T)$ or $\delta^{T^*}(T)$.

$\delta^{T^*}$ is a δ-projection at the top of T*.

sch($\delta^{T^*}$) is a set containing real and virtual attributes from one or more of base relations in T*, such that if $T^*=\pi_{R_T}(T)$, then sch($\delta^{T^*}$)=∅.

$T=T_1 \cdot T_r$ is an association tree of $G|_{leaves(T)}$ where $T_1$ and $T_r$ are left and right subtrees of T, respectively.

$T=(R_T, V_T, \text{ext}(T))$.

PROJECTION-SET(T)=$\{X|\delta_X(e_X) \in Q'$ and $\delta_X(e_X)$ has been used in T$\}$.

POTENTIAL-PROJECTIONS (T) = $\{X|X \in \text{PROJECTION-SET}(Q') \land X \subseteq R_T\}$—PROJECTION-SET(T), a temporary set containing attributes corresponding to δ-projections in $Q'$ that can be applied to T.

$E_T$ is a set of hyperedges in G that connect leaves of $T_1$ with leaves of $T_r$.

e is a hyperedge in E.

$J_T=\{A|A \in \text{sch}(T) \text{ and } A \text{ is referenced by } e \in (E-E_T)\}$.

$S_1$, $S_2$ are temporary sets.

Flowchart

Figure 9A:
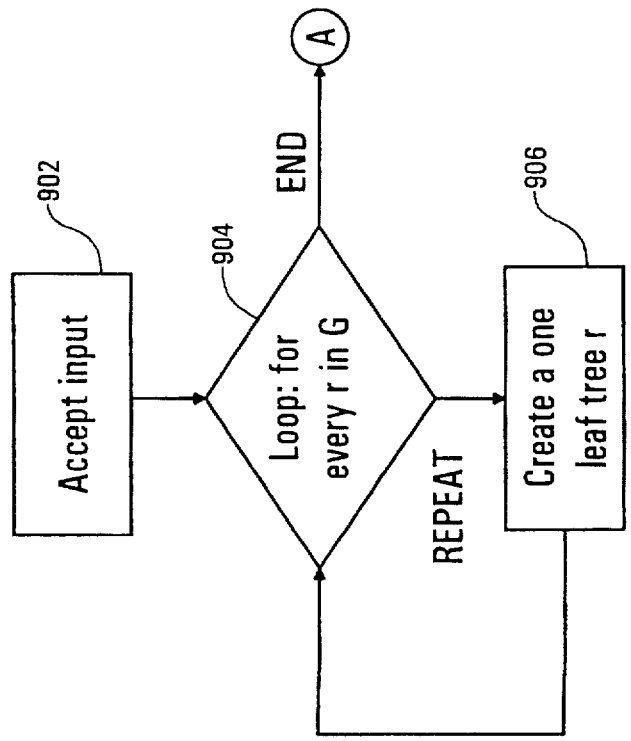
FIGS. 9A–9F together are a flowchart illustrating a first method of generating association trees for SQL queries heuristically with no regression according to the present invention.

Referring to FIG. 9A, block 902 accepts as input into the routine a query graph G=(V, E).

Block 904 is a decision block that represents a sequential "for" loop that is executed once for each relation r referenced in G. Block 904 transfers control to block 906 as the first step of the loop for each relation. Otherwise, control transfers to "A" in FIG. 9B after all the relations have been processed in the loop.

Block 906 creates a one leaf tree r. Thereafter, control is returned to block 904 to complete the loop.

Figure 9B:
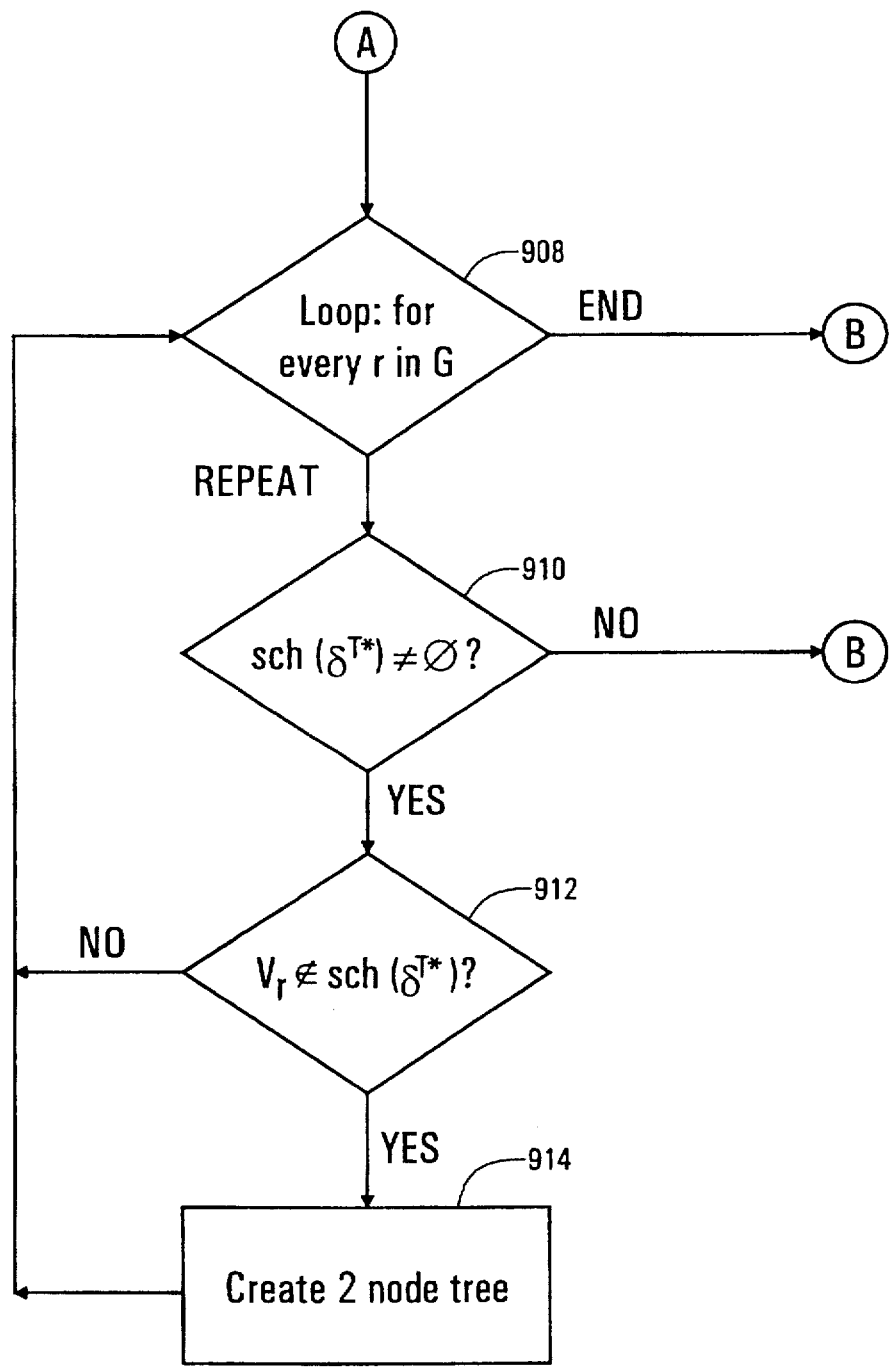

Referring now to FIG. 9B, block 908 is a decision block that represents a sequential "for" loop that is executed once for each relation r referenced in G. Block 908 transfers control to block 910 as the first step of the loop for each relation. Otherwise, control transfers to "B" in FIG. 9C after all the relations have been processed in the loop.

Block 910 is a decision block that determines whether sch($\delta^{T^*}$)≠∅. If not, then control transfers to "B" in FIG. 9C. Otherwise, control is transferred to block 912.

Block 912 is a decision block that determines whether, for each relation r referenced in G, $V_r \notin \text{sch}(\delta^{T^*})$. If not, then control is returned to block 908 to complete the loop. Otherwise, control is transferred to block 914.

Block 914 creates a two node tree comprising $\delta_{sch(r) \cap sch}(\delta_{T} \cup_{J_T}(r))$. Thereafter, control is returned to block 908 to complete the loop.

Figure 9C:
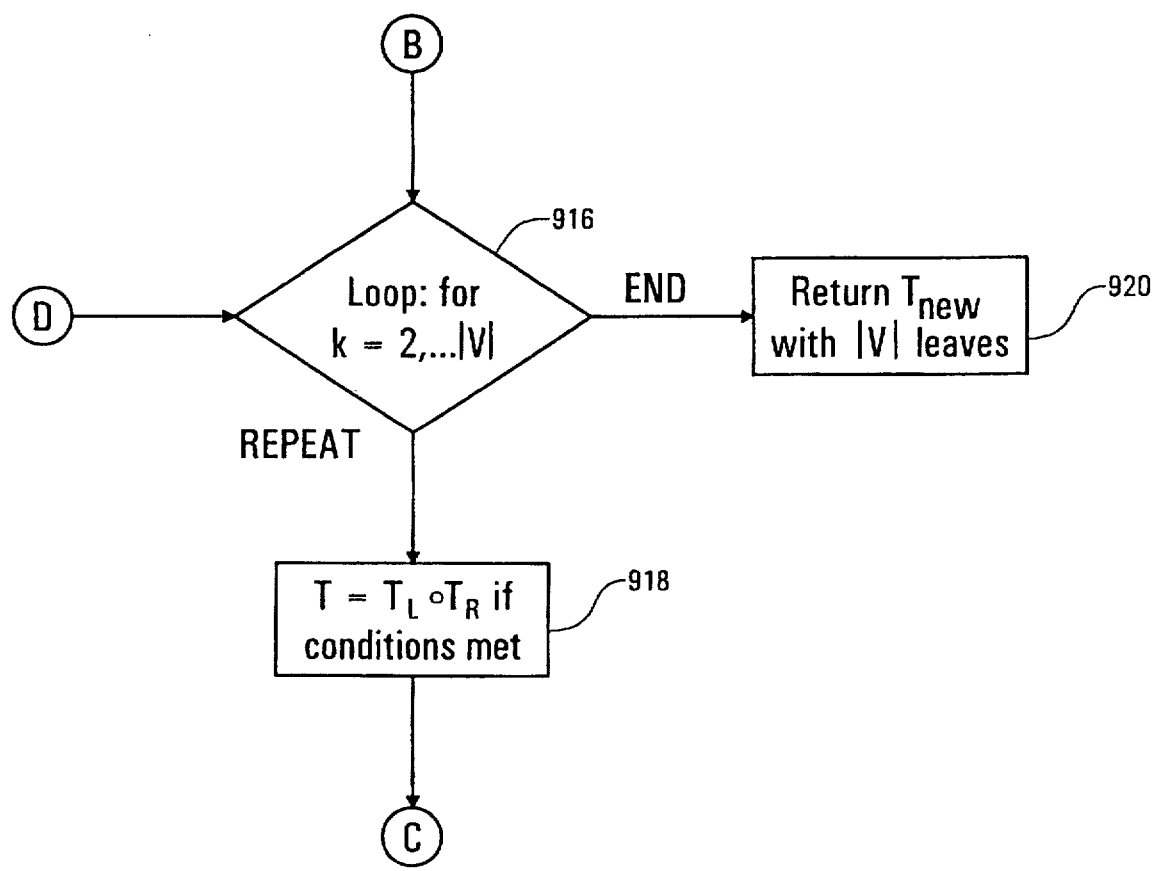

Referring now to FIG. 9C, block 916 is a decision block that represents a sequential "for" loop that is executed once for each k=2,3, ..., |V|. Block 916 transfers control to block 918 as the first step of the loop for each relation. Otherwise, control transfers to block 920 after the loop is completed, which terminates the HUERISTIC1-NO-REGRESSION routine, returns as its output all $T_{new}$ trees with |V| leaves (i.e., all possible association trees for G), and returns control to the calling routine.

Block 918 combines subtrees $T_1$ and $T_r$ to form $T=T_1 \cdot T_r$ provided certain conditions are met. These conditions include the following:

leaves($T_1$)∩leaves($T_r$)=∅.

|leaves($T_1$)|+|leaves($T_r$)|=k.

$G|_{leaves(T_1) \cup leaves(T_r)}$ is connected.

$\forall e=(V_1, V_2) \in E_T$, either $V_1 \subseteq \text{leaves}(T_1)$ and $V_2 \subseteq \text{leaves}(T_r)$ or $V_2 \subseteq \text{leaves}(T_1)$ and $V_1 \subseteq \text{leaves}(T_r)$. Thereafter, control is transferred to "C" in FIG. 9D.

Figure 9D:
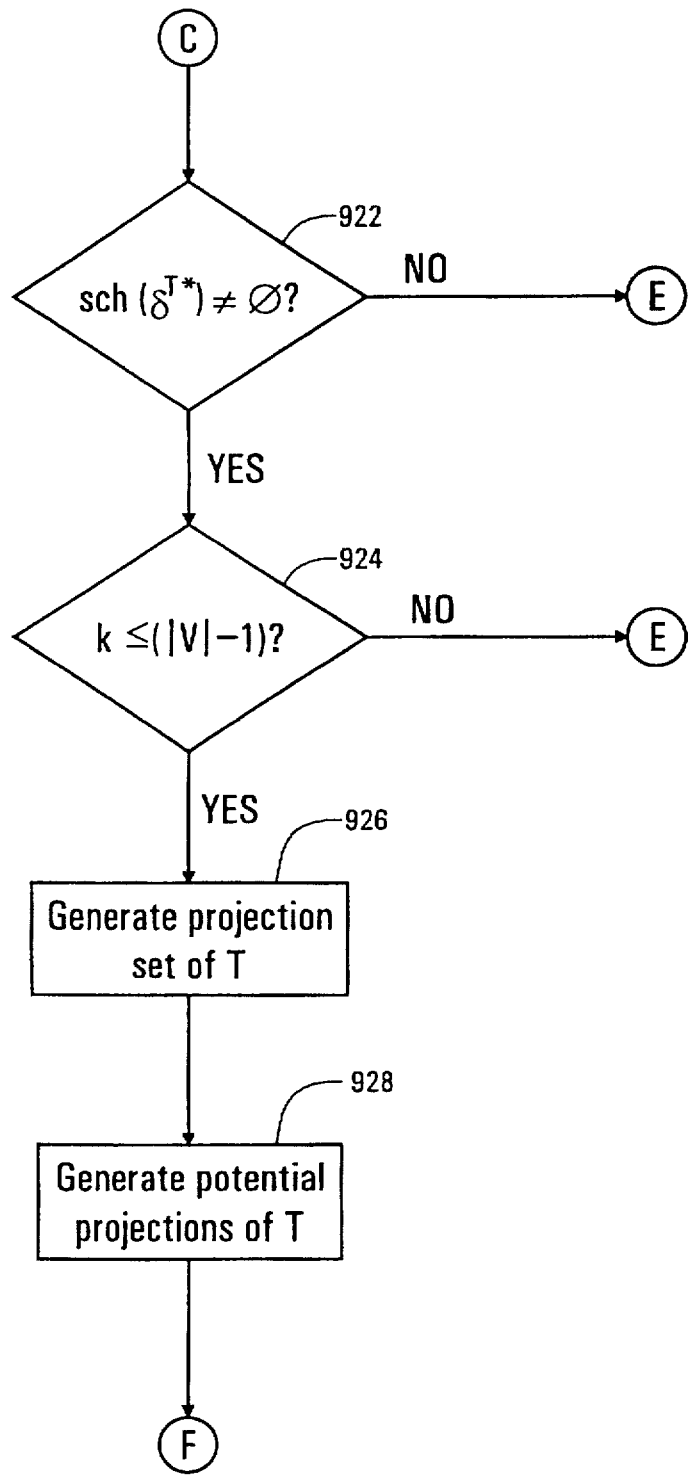

Referring now to FIG. 9D, block 922 is a decision block that determines whether sch($\delta^{T^*}$)≠∅. If not, then control is transferred to "E" in FIG. 9F. Otherwise, control is transferred to block 924.

Block 924 is a decision block that determines whether k≤(|V|-1). If so, then control is transferred to block 926. Otherwise, control is transferred to "E" in FIG. 9F.

Block 926 generates PROJECTION-SET(T) by storing PROJECTION-SET($T_1$)∪PROJECTION-SET($T_r$) into PROJECTION-SET(T). Block 928 generates POTENTIAL-PROJECTIONS(T) by storing $\{X|X \in \text{PROJECTION-SET}(Q') \land X \subseteq R_T\}$—PROJECTION-SET(T) into POTENTIAL-PROJECTIONS(T). Thereafter, control is transferred to "F" in FIG. 9E.

Figure 9E:
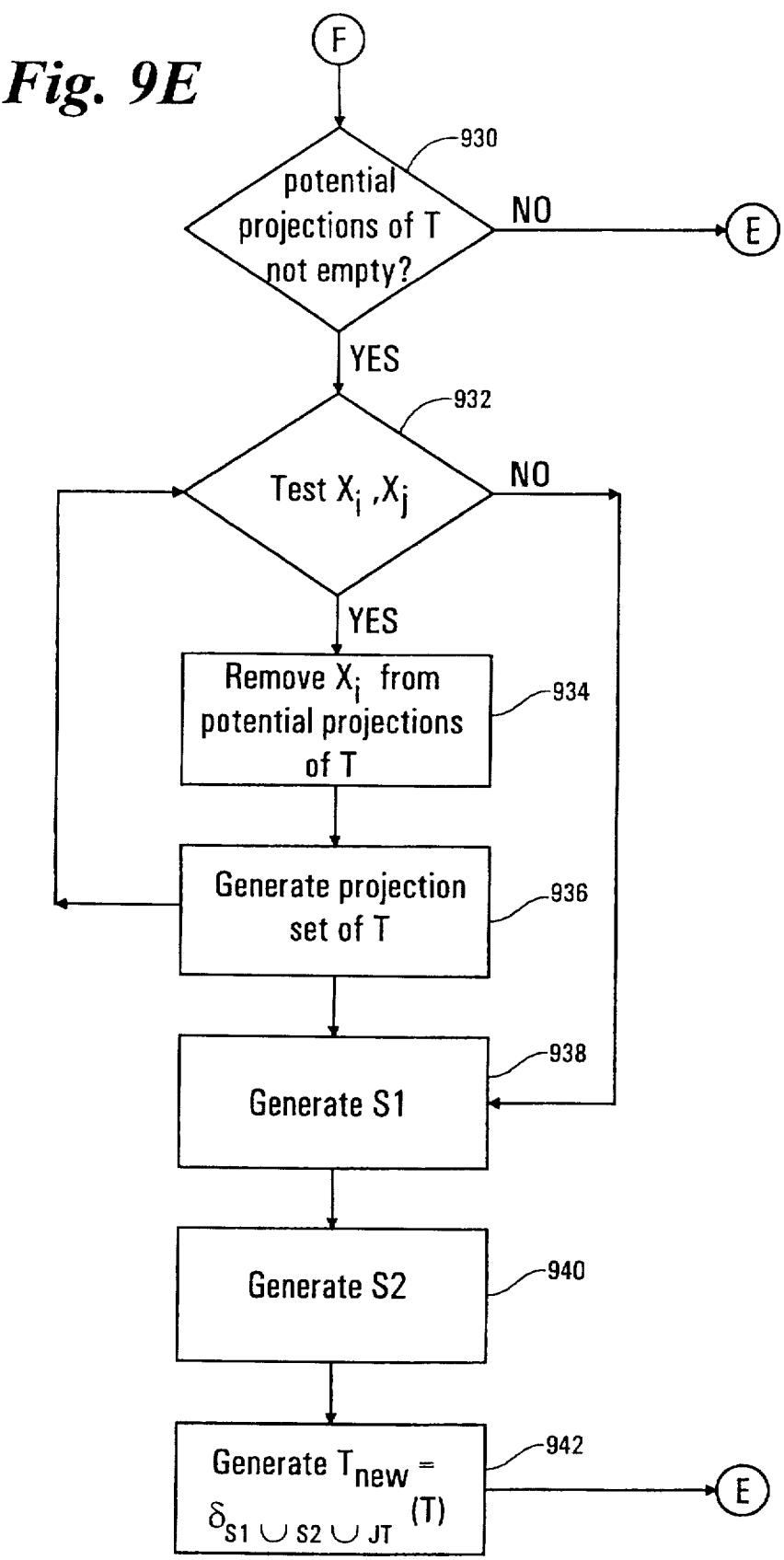

Referring now to FIG. 9E, block 930 is a decision block that determines whether POTENTIAL-PROJECTIONS(T) ≠∅. If so, then control is transferred to block 932. Otherwise, control is transferred to "E" in FIG. 9F.

Block 932 is a decision block that tests whether there are $X_i$, $X_i \in \text{POTENTIAL-PROJECTIONS(T)}$ such that REQUIRED-SET($\delta_{X_i}$)⊆REQUIRED-SET($\delta_{X_j}$). If so, then control is transferred to block 934, which removes $X_i$ from POTENTIAL-PROJECTIONS(T), and to block 936, which generates PROJECTION-SET(T) by storing PROJECTION-SET(T)={$X_i$}∪PROJECTION-SET(T). Thereafter, control is transferred back to block 932.

Block 938 constructs $S_1$=∪$(X_j \in$POTENTIAL-PROJECTIONS(T)). Block 940 constructs $S_2$=∪$_{(sch(r) \subseteq RT)}$ (sch(r)∩$S_{1-s}$) ((sch($\delta^{T^*}$))∩sch(r))∪$V_r$). Block 942 generates $T_{new}$=$\delta_{S_1 \cup S_2 \cup J_T}$(T). Thereafter, control is transferred to "E" in FIG. 9F.

Figure 9F:
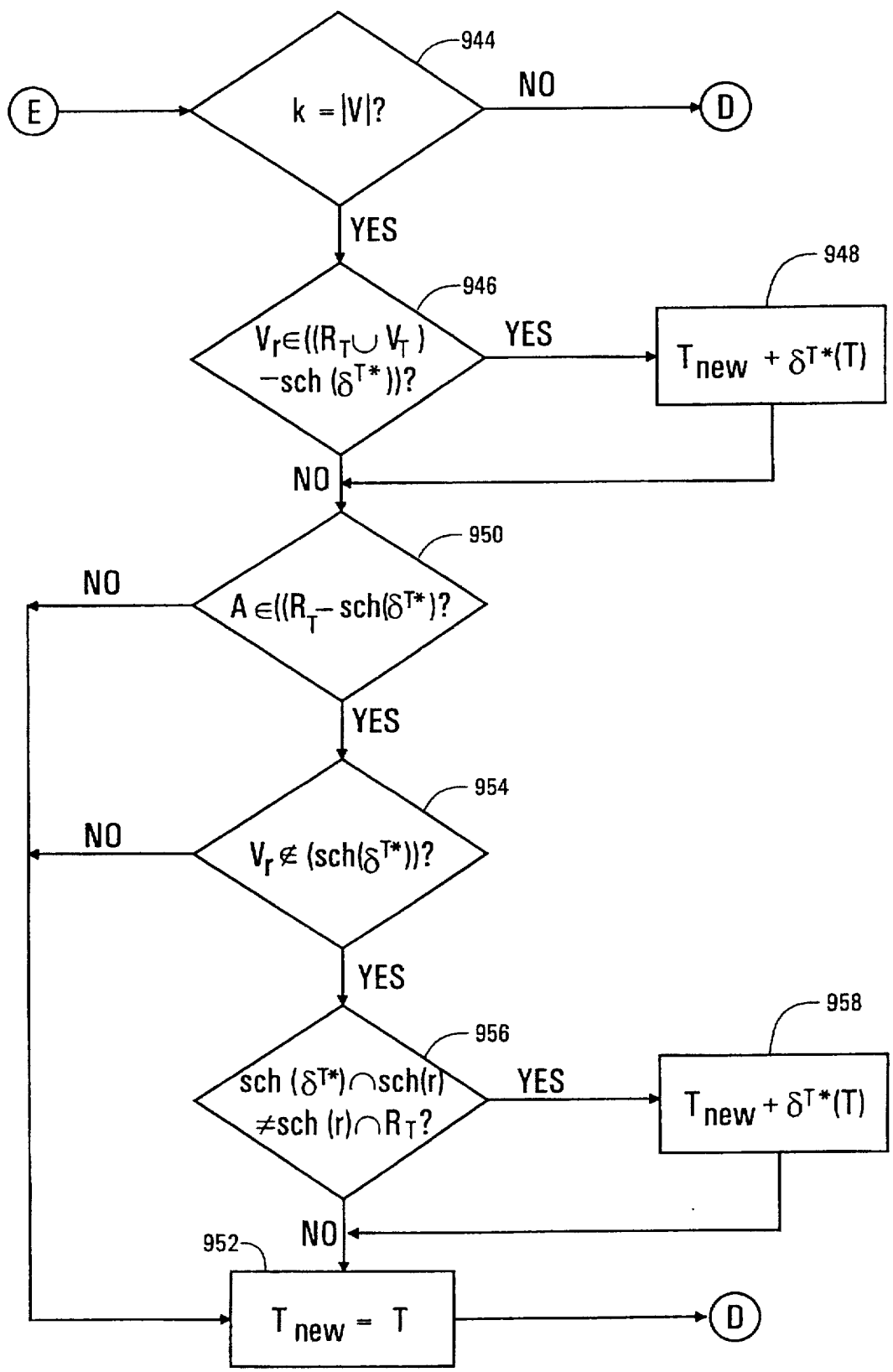

Referring now to FIG. 9F, block 944 is a decision block that determines whether k=|V|. If not, then control is transferred to "D" in FIG. 9C, which returns to block 916 to complete the loop. Otherwise, control is transferred to block 946.

Block 946 is a decision block that determines whether the virtual attribute $V_r$ of any base relation r is in the set (($R_T \cup V_T$)−sch($\delta^{T^*}$)). If so, then control is transferred to block 948, which generates $T_{new}$=$\delta^{T^*}$(T). Otherwise, control is transferred to block 950.

Block 950 is a decision block that determines whether real attribute A of base relation r is in the set ($R_T$−($J_T \cup$sch($\delta^{T^*}$))). If not, then control is transferred to block 952. Otherwise, control is transferred to block 954.

Block 954 is a decision block that determines whether $V_r \notin$sch($\delta^{T^*}$). If so, then control is transferred to block 956. Otherwise, control is transferred to block 952.

Block 956 is a decision block that determines whether sch($\delta^{T^*}$)∩sch(r)≠sch(r)∩$R_T$. If so, then control is transferred to block 958, which generates $T_{new}$=$\delta^{T^*}$(T). Otherwise, control is transferred to block 952.

Block 952 sets $T_{new}$=T. Thereafter, control is transferred to "D" in FIG. 9C, which returns to block 916 to complete the loop.

EXAMPLE

Table 2 illustrates the different schedules generated by the HUERISTIC1-NO-REGRESSION routine for query $Q_1$. Note that the sequence of transitions between intermediate states A, $\delta_{B_1,B_2,B_3}$(B), C, $T_2$ and $T_3$ leads to final state $T_8$ which contains projections and binary operations in the same order as in the original query $Q_1$.

HUERISTIC METHOD #2 WITH NO REGRESSION

FIGS. 10A–10F together are a flowchart illustrating a second method of generating association trees for SQL queries heuristically with no regression according to the present invention. The HUERISTIC2-NO-REGRESSION routine generates the same number of intermediate states as generated by the ALL-TREES method in [BHAR94], which considers binary operations only. Note that the HUERISTIC2-NO-REGRESSION routine generates no regression plan for the query obtained after applying identity (14). If no regression plan is required for the original query, then identity (14) should not be applied. Note that the HUERISTIC2-NO-REGRESSION routine does not generate additional states due to δ-projections. Whenever possible, it reduces the number of intermediate states by retaining only those plans that contain δ-projection at the top. It is based on the hueristic that the cost of the plans can be reduced by removing duplicates from the intermediate relations and, consequently, it schedules δ-projections as early as possible.

Notation

T* is an expression tree returned by the PROJECTION PUSH-UP routine.

T* is either $\pi_{R_T}$(T) or $\pi_{R_T}\delta^{T^*}$(T) or $\delta^{T^*}$(T).

$\delta^{T^*}$ is a δ-projection at the top of T*.

sch($\delta^{T^*}$) is a set containing real and virtual attributes from one or more of base relations in T*, such that if T*=$\pi_{R_T}$(T), then sch($\delta^{T^*}$)=∅.

T=$T_1 \cdot T_r$ is an association tree of G$|_{leaves(T)}$, where $T_1$ and $T_r$ are left and right subtrees of T, respectively.

T=($R_T$, $V_T$, ext(T)).

PROJECTION-SET(T)={X|$\delta_X$($e_X$)∈Q' and $\delta_X$($e_X$) has been used in T}.

POTENTIAL-PROJECTIONS(T) = { X | X ∈ PROJECTION-SET(Q') ∧X ⊆$R_T$}−PROJECTION-SET(T), a temporary set containing attributes corresponding to δ-projections in Q' that can be applied to T.

$E_T$ is a set of hyperedges in G that connect leaves of $T_1$ with leaves of $T_r$.

e is a hyperedge in E.

$J_T$={A|A∈sch(T) and A is referenced by e∈(E−$E_T$)}.

$S_1$, $S_2$ are temporary sets.

Flowchart

Figure 10A:
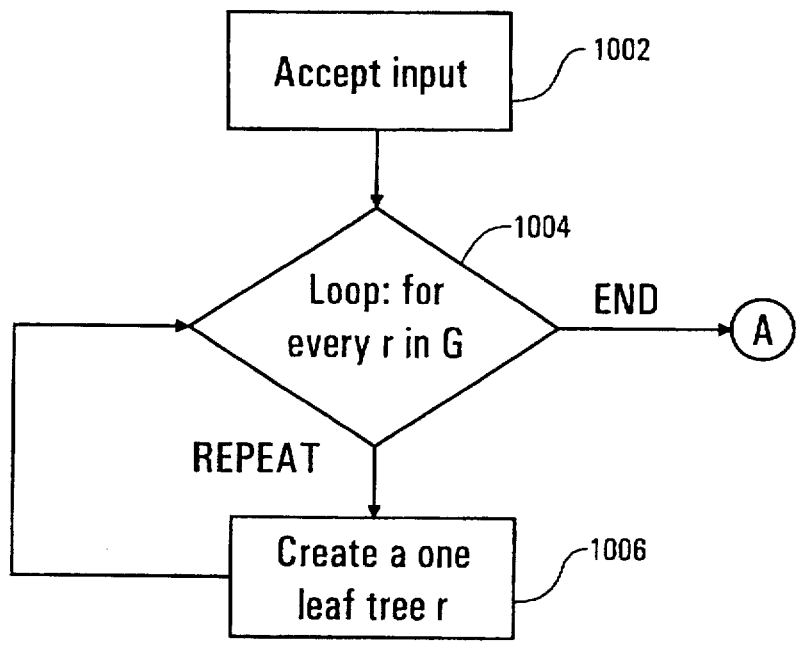
FIGS. 10A–10F together are a flowchart illustrating a first method of generating association trees for SQL queries heuristically with no regression according to the present invention.

Referring to FIG. 10A, block 1002 accepts as input into the routine a query graph G=(V, E).

Block 1004 is a decision block that represents a sequential "for" loop that is executed once for each relation r referenced in G. Block 1004 transfers control to block 1006 as the first step of the loop for each relation. Otherwise, control transfers to "A" in FIG. 10B after all the relations have been processed in the loop.

Block 1006 creates a one leaf tree r. Thereafter, control is returned to block 1004 to complete the loop.

Figure 10B:
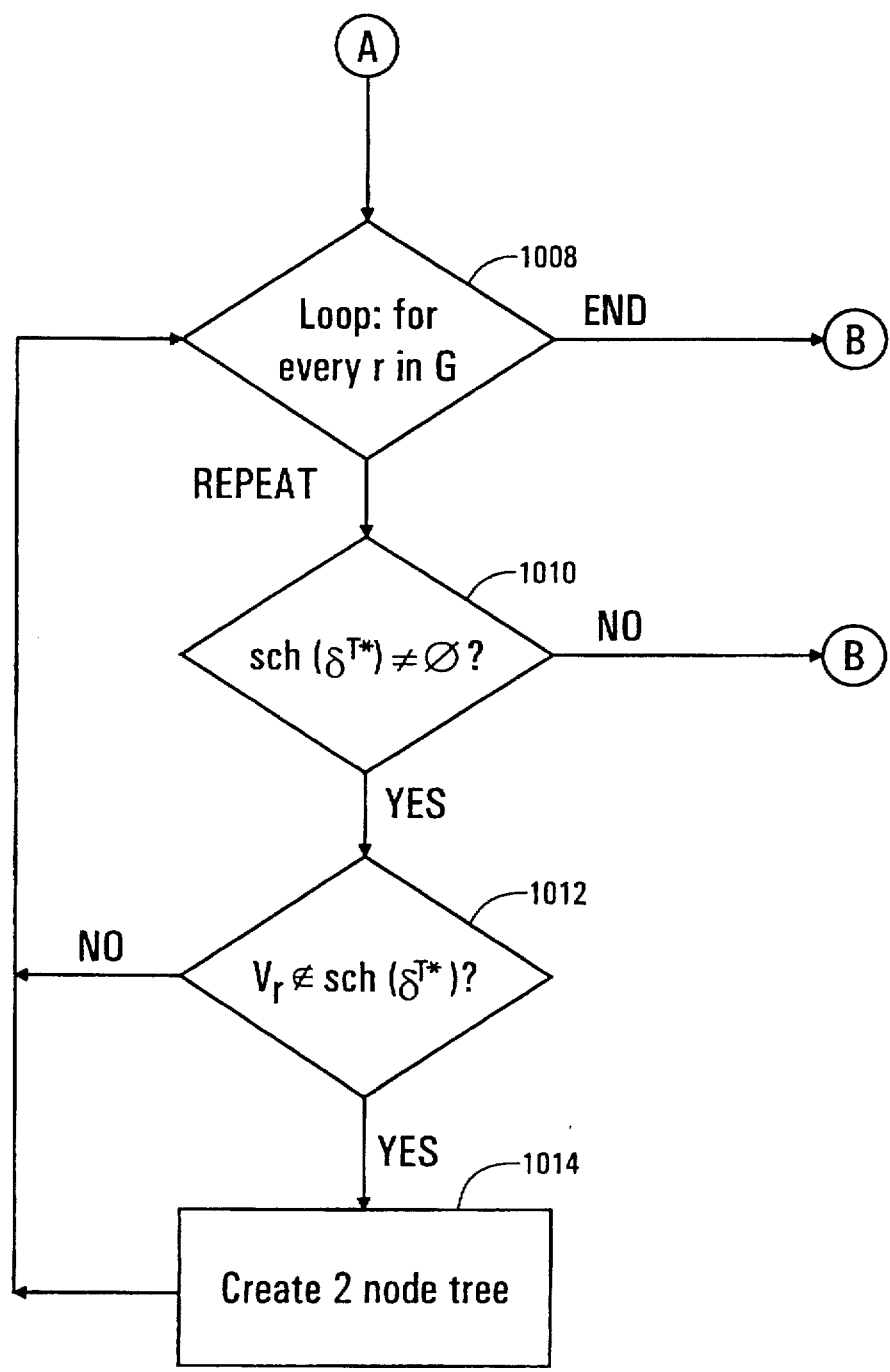

Referring now to FIG. 10B, block 1008 is a decision block that represents a sequential "for" loop that is executed once for each relation r referenced in G. Block 1008 transfers control to block 1010 as the first step of the loop for each relation. Otherwise, control transfers to "B" in FIG. 10C after all the relations have been processed in the loop.

Block 1010 is a decision block that determines whether sch($\delta^{T^*}$)≠∅. If not, then control transfers to "B" in FIG. 10C. Otherwise, control is transfers to block 1012.

Block 1012 is a decision block that determines whether, for each relation r referenced in G, $V_r \notin$sch($\delta^{T^*}$). If not, then control is returned to block 1008 to complete the loop. Otherwise, control is transferred to block 1014.

Block 1014 creates a two node tree comprising $\delta_{sch(r) \cap sch}$ $_{(\delta^{T^*}) \cup J_T}$(r). Thereafter, control is returned to block 1008 to complete the loop.

Figure 10C:
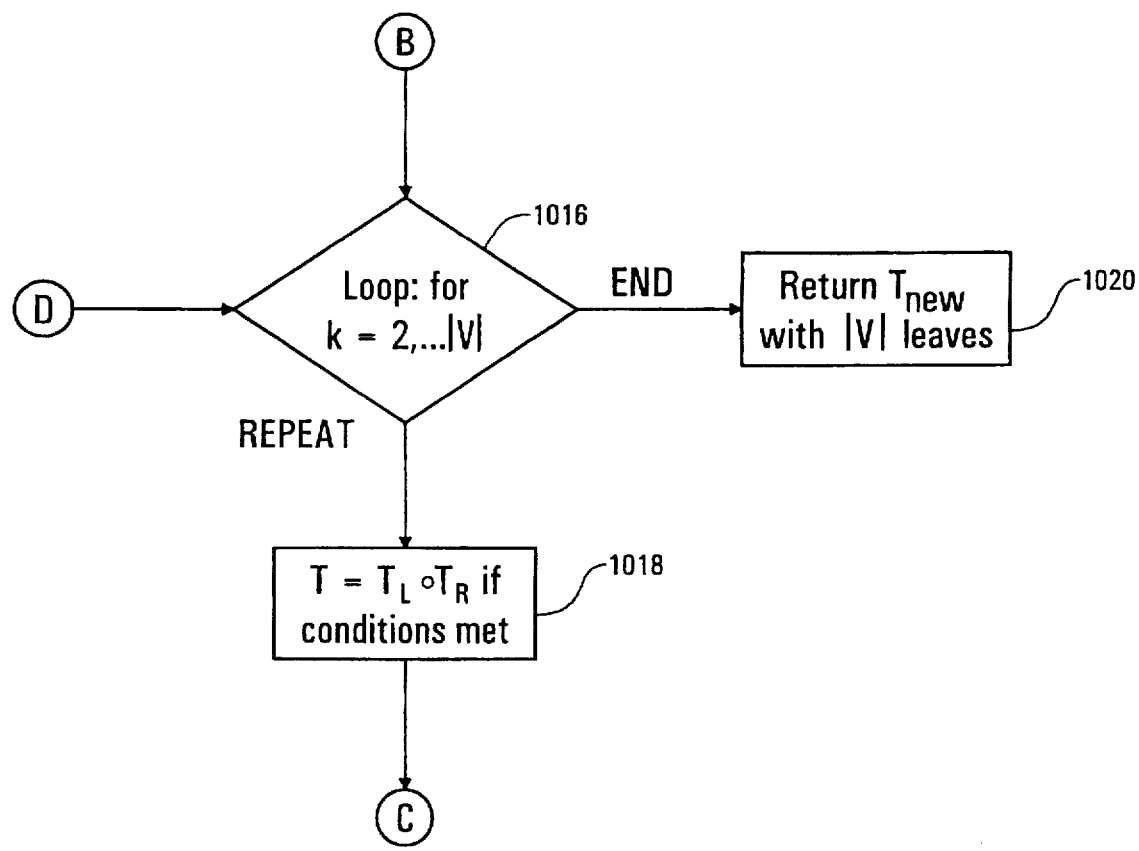

Referring now to FIG. 10C, block 1016 is a decision block that represents a sequential "for" loop that is executed once for each k=2,3, . . . , |V|. Block 1016 transfers control to block 1018 as the first step of the loop for each relation. Otherwise, control transfers to block 1020 after the loop is completed, which terminates the HUERISTIC2-NO-REGRESSION routine, returns as its output all $T_{new}$ with |V| leaves (i.e., all possible association trees for G), and returns control to the calling routine.

Block 1018 combines subtrees $T_1$ and $T_r$ to form T=$T_1 \cdot T_r$ provided certain conditions are met. These conditions include the following:

leaves($T_1$)∩leaves($T_r$)=∅.

|leaves($T_1$)|+|leaves($T_r$)|=k.

G$|_{leaves(T_1) \cup leaves(T_r)}$ is connected.

∀e=($V_1$, $V_2$)∈$E_T$, either $V_1 \subseteq$leaves($T_1$) and $V_2 \subseteq$leaves($T_r$) or $V_2 \subseteq$leaves($T_1$) and $V_1 \subseteq$leaves($T_r$).

Figure 10D:
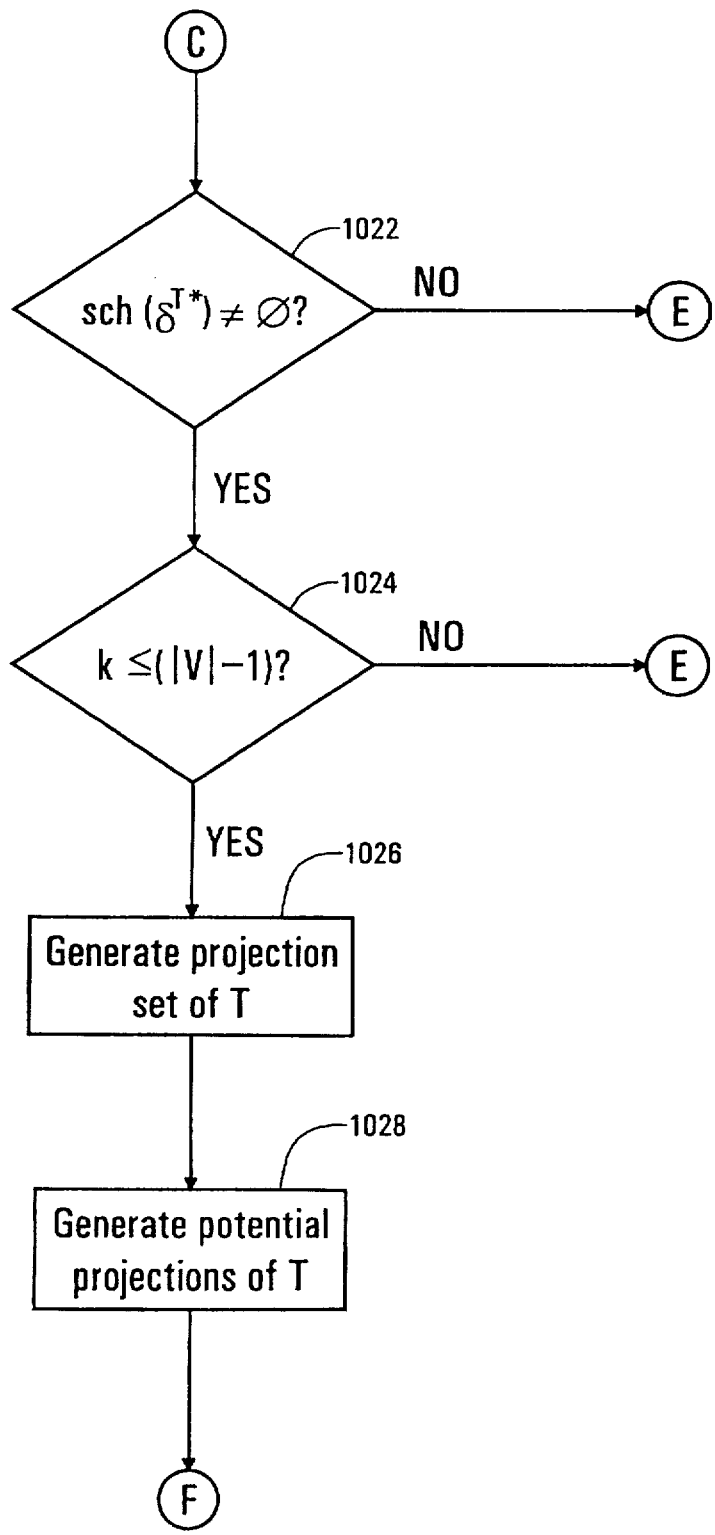

Thereafter, control is transferred to "C" in FIG. 10D.

Referring now to FIG. 10D, block 1022 is a decision block that determines whether sch($\delta^{T'}$)≠∅. If not, then control is transferred to "E" in FIG. 10F. Otherwise, control is transferred to block 1024.

Block 1024 is a decision block that determines whether k≤(|V|-1). If so, then control is transferred to block 1026. Otherwise, control is transferred to "E" in FIG. 10F.

Block 1026 generates PROJECTION-SET(T) by storing PROJECTION-SET($T_1$)∪PROJECTION-SET($T_r$) into PROJECTION-SET(T). Block 1028 generates POTENTIAL-PROJECTIONS(T) by storing $\{X | X \in PROJECTION-SET(Q') \wedge X \subseteq R_T\}$—PROJECTION-SET(T) into POTENTIAL-PROJECTIONS(T). Thereafter, control is transferred to "F" in FIG. 10E.

Figure 10E:
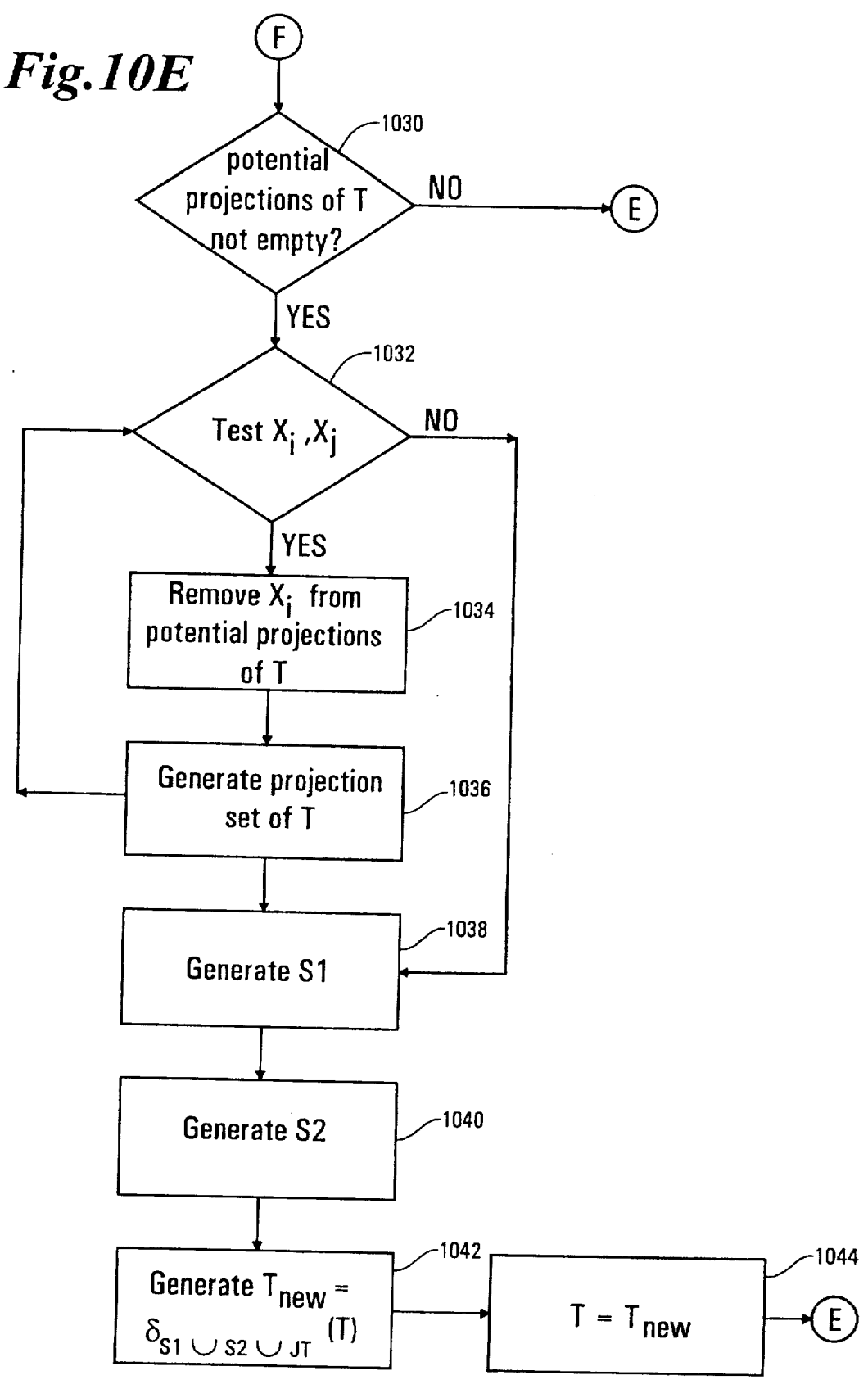

Referring now to FIG. 10E, block 1030 is a decision block that determines whether POTENTIAL-PROJECTIONS(T) ≠∅. If so, then control is transferred to block 1032. Otherwise, control is transferred to "E" in FIG. 10F.

Block 1032 is a decision block that tests whether there are $X_j$, $X_i \in$POTENTIAL-PROJECTIONS(T) such that REQUIRED-SET($\delta_{x_j}$)$\subseteq$REQUIRED-SET($\delta_{x_i}$). If so, then control is transferred to block 1034. Otherwise, control is transferred to block 1038.

Block 1034 removes $X_i$ from POTENTIAL-PROJECTIONS(T) and block 1036 generates PROJECTION-SET(T) by storing PROJECTION-SET(T)={$X_i$}∪PROJECTION-SET(T), and control transfers back to block 1032.

Block 1038 constructs $S_1$=∪($X_j \in$POTENTIAL-PROJECTIONS(T)). Block 1040 constructs $S_2$=∪$_{(sch(r) \subseteq R_T)}$ (sch(r)∩$s_{1-ϕ}$) ((sch($\delta^{T'}$)∩sch(r))∪$V_r$). Block 1042 generates $T_{new}$=$\delta_{S_1 \cup S_2 \cup T_r}$(T). Block 1044 then sets T=$T_{new}$. Thereafter, control is transferred to "E" in FIG. 10F.

Figure 10F:
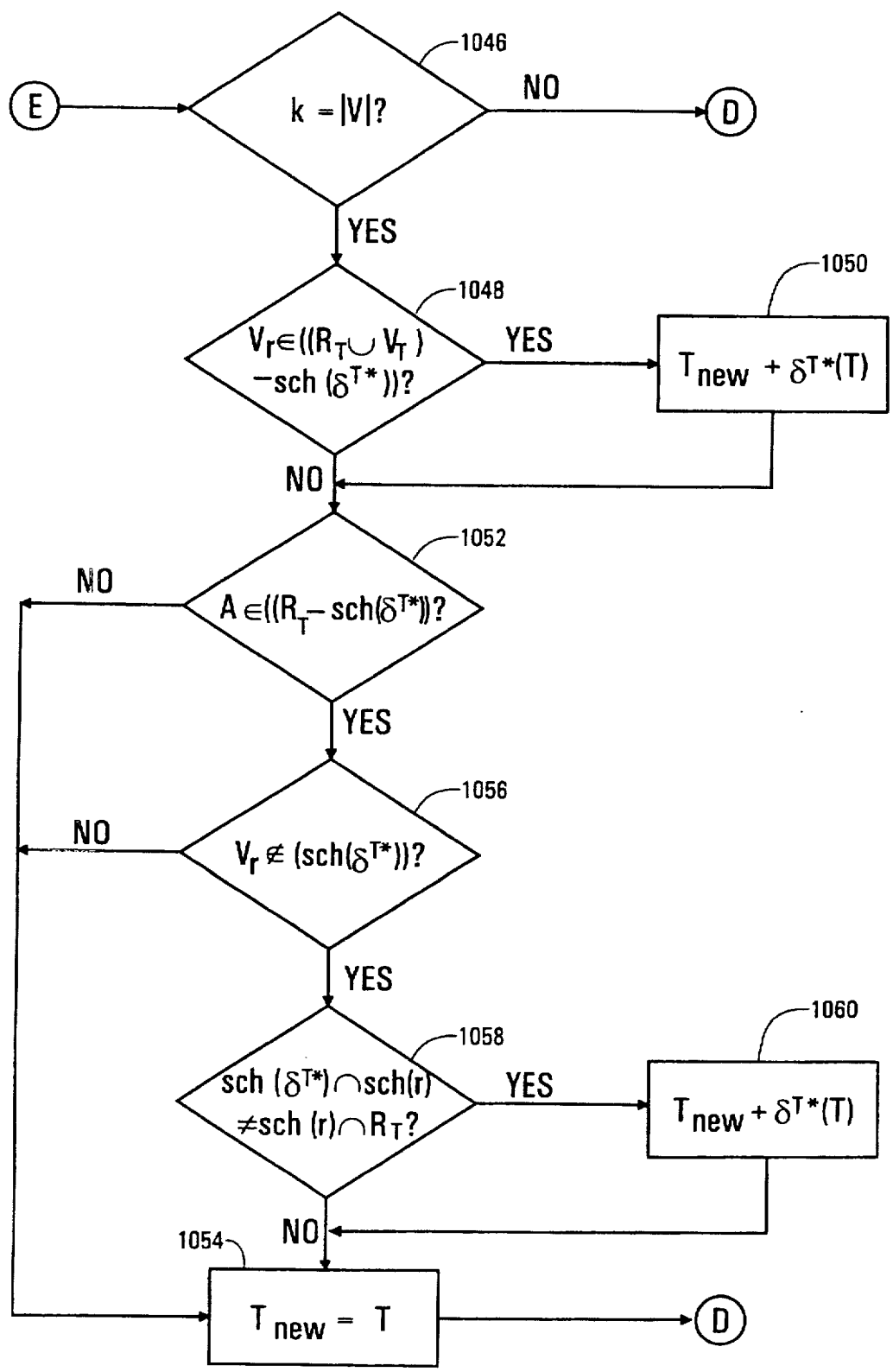

Referring now to FIG. 10F, block 1046 is a decision block that determines whether k=|V|. If not, then control is transferred to "D" in FIG. 10C, which returns to block 1016 to complete the loop. Otherwise, control is transferred to block 1048.

Block 1048 is a decision block that determines whether virtual attribute $V_r$ of base relation r is in the set (($R_T \cup V_T$)−sch($\delta^{T'}$)). If so, then control is transferred to block 1050, which generates $T_{new}$=$\delta^{T'}$(T). Otherwise, control is transferred to block 1052.

Block 1052 is a decision block that determines whether real attribute A of base relation r is in the set ($R_T$−($J_T$∪sch ($\delta^{T'}$))). If not, then control is transferred to block 1054. Otherwise, control is transferred to block 1056.

Block 1056 is a decision block that determines whether $V_r \notin$sch($\delta^{T'}$). If so, then control is transferred to block 1058. Otherwise, control is transferred to block 1054.

Block 1058 is a decision block that determines whether sch($\delta^{T'}$)∩sch(r)≠sch(r)∩$R_T$. If so, then control is transferred to block 1060, which generates $T_{new}$=$\delta^{T'}$(T). Otherwise, control is transferred to block 1054.

Block 1054 sets $T_{new}$=T. Thereafter, control is transferred to "D" in FIG. 10C, which returns to block 1016 to complete the loop.

EXAMPLE

Table 3 illustrates the different schedules generated by the HUERISTIC2-NO-REGRESSION routine for query $Q_1$. Note that the sequence of transitions between intermediate states A, $\delta_{B_1B_2B_3}$(B), C, $T_1$ and $T_2$ leads to final state $T_4$ which contains projections and binary operations in the same order as in the original query $Q_1$.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses techniques to improve the performance of the SQL queries containing selections, projections, joins, outer and full outer joins. The present invention includes methods of optimally scheduling projections specified between binary operations and a set of methods of generating the optimal schedule for a given query. These methods ensure that the cost of the original query is compared with the cost of other schedules. These methods can improve the execution time of SQL queries significantly over the prior art.

The foregoing description of the preferred embodiment of the invention has been presented for the purposes of illustration and description only. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| k | T | | $T_{new}$ |
|---|---|---|---|
| 1 | A | | $\delta_{A_1A_2}(A)$ |
|   | B | | $\delta_{B_1B_2B_3}(B)$ |
|   | C | | |
| 2 | $T_0 = A \quad \overset{A_1=B_1}{\underset{\circ}{}} \quad B$ | | $T_1 = \delta_{A_1A_2B_2B_3}(T_0)$ |
|   | $T_2 = \delta_{A_1A_2}(A) \quad \overset{A_1=B_1}{\underset{\circ}{}} \quad B$ | | $T_3 = \delta_{A_1A_2B_2B_3}(T_2)$ |
|   | $T_4 = A \quad \overset{A_1=B_1}{\underset{\circ}{}} \quad \delta_{B_1B_2B_3}(B)$ | | $T_5 = \delta_{A_1A_2B_2B_3}(T_4)$ |
|   | $T_6 = \delta_{A_1A_2}(A) \quad \overset{A_1=B_1}{\underset{\circ}{}} \quad \delta_{B_1B_2B_3}(B)$ | | $T_7 = \delta_{A_1A_2B_2B_3}(T_6)$ |
|   | $T_8 = A \quad \overset{A_2=C_2}{\underset{\circ}{}} \quad C$ | | $T_9 = \delta_{A_1A_2C_1C_2C_3V_c}(T_8)$ |
|   | $T_{10} = \delta_{A_1A_2}(A) \quad \overset{A_2=C_2}{\underset{\circ}{}} \quad C$ | | ϕ |
| 3 | $T_{11} = T_0 \quad \overset{A_2=C_2}{\underset{\circ}{}} \quad C$ | | $\delta_{A_1A_2B_2B_3C_1C_2C_3V_c}(T_{11})$ |
|   | $T_{12} = T_2 \quad \overset{A_2=C_2}{\underset{\circ}{}} \quad C$ | | $\delta_{A_1A_2B_2B_3C_1C_2C_3V_c}(T_{12})$ |
|   | $T_{13} = T_4 \quad \overset{A_2=C_2}{\underset{\circ}{}} \quad C$ | | $\delta_{A_1A_2B_2B_3C_1C_2C_3V_c}(T_{13})$ |
|   | $T_{14} = T_6 \quad \overset{A_2=C_2}{\underset{\circ}{}} \quad C$ | | $\delta_{A_1A_2B_2B_3C_1C_2C_3V_c}(T_{14})$ |
|   | $T_j = T_i \quad \overset{A_2=C_2}{\underset{\circ}{}} \quad C$ | | $T_j$ | where i = 1, 3, 5, 7 and 15 ≥ j ≥ 18

TABLE 1-continued

| k | T | | $T_{new}$ |
|---|---|---|---|
| | $T_{19} = T_8 \stackrel{A_1=B_1}{\underset{\circ}{}} B$ | | $\delta_{A_1A_2B_2B_3C_1C_2C_3V_c}(T_{19})$ |
| | $T_{20} = T_8 \stackrel{A_1=B_1}{\underset{\circ}{}} \delta_{B_1B_2B_3}(B)$ | | $\delta_{A_1A_2B_2B_3C_1C_2C_3V_c}(T_{20})$ |
| | $T_{21} = T_9 \stackrel{A_1=B_1}{\underset{\circ}{}} B$ | | $\delta_{A_1A_2B_2B_3C_1C_2C_3V_c}(T_{21})$ |
| | $T_{22} = T_9 \stackrel{A_1=B_1}{\underset{\circ}{}} \delta_{B_1B_2B_3}(B)$ | | $\delta_{A_1A_2B_2B_3C_1C_2C_3V_c}(T_{22})$ |
| | $T_{23} = T_{10} \stackrel{A_1=B_1}{\underset{\circ}{}} B$ | | $\delta_{A_1A_2B_2B_3C_1C_2C_3V_c}(T_{23})$ |
| | $T_{24} = T_{10} \stackrel{A_1=B_1}{\underset{\circ}{}} \delta_{B_1B_2B_3}(B)$ | | $\delta_{A_1A_2B_2B_3C_1C_2C_3V_c}(T_{24})$ |

TABLE 2

| k | T | | $T_{new}$ |
|---|---|---|---|
| 1 | A B C | | $\delta_{B_1B_2B_3}(B)$ |
| 2 | $T_0 = A \stackrel{A_1=B_1}{\underset{\circ}{}} B$ | | $T_1 = \delta_{A_1A_2B_2B_3}(T_0)$ |
| | $T_2 = A \stackrel{A_1=B_1}{\underset{\circ}{}} \delta_{B_1B_2B_3}(B)$ | | $T_3 = \delta_{A_1A_2B_2B_3}(T_2)$ |
| | $T_4 = A \stackrel{A_2=C_2}{\underset{\circ}{}} C$ | | $\phi$ |
| 3 | $T_5 = T_0 \stackrel{A_2=C_2}{\underset{\circ}{}} C$ | | $\delta_{A_1A_2B_2B_3C_1C_2C_3V_c}(T_5)$ |
| | $T_6 = \left( T_2 \stackrel{A_2=C_2}{\underset{\circ}{}} C \right)$ | | $\delta_{A_1A_2B_2B_3C_1C_2C_3V_c}(T_6)$ |
| | $T_j = T_i \stackrel{A_2=C_2}{\underset{\circ}{}} C$ | | $T_j$ | where i = 1, 3 and j = 7, 8

| | $T_9 = T_4 \stackrel{A_1=B_1}{\underset{\circ}{}} B$ | | $\delta_{A_1A_2B_2B_3C_1C_2C_3V_c}(T_9)$ |
|---|---|---|---|
| | $T_{10} = \left( T_4 \stackrel{A_1=B_1}{\underset{\circ}{}} \delta_{B_1B_2B_3}(B) \right)$ | | $\delta_{A_1A_2B_2B_3C_1C_2C_3V_c}(T_{10})$ |

TABLE 3

| k | T | | $T_{new}$ |
|---|---|---|---|
| 1 | A $\phi$ C | | $\delta_{B_1B_2B_{3(B)}}$ |
| 2 | $T_1 = A \stackrel{A_1=B_1}{\underset{\circ}{}} \delta_{B_1B_2B_3}(B)$ | | $T_1 = \delta_{A_1A_2B_2B_3}(T_1)$ |
| | $T_3 = A \stackrel{A_2=C_2}{\underset{\circ}{}} C$ | | $\phi$ |

TABLE 3-continued

| k | T | | $T_{new}$ |
|---|---|---|---|
| 3 | $T_4 = T_2 \stackrel{A_2=C_2}{\underset{\circ}{}} C$ | | $T_4$ |
| | $T_5 = T_3 \stackrel{A_1=B_1}{\underset{\circ}{}} \delta_{B_1B_2B_3}(B)$ | | $\delta_{A_1A_2B_2B_3C_1C_2C_3V_c}(T_5)$ |

What is claimed is:

1. A method of simplifying a query in a computer, the query being performed by the computer to retrieve data from a database stored in a electronic storage device coupled to the computer, the method comprising the steps of:

(a) accepting the query into the computer; and (b) replacing a first expression in the query with a second expression, wherein the first expression comprises:

$$\delta_{X_1}(e_x) \odot \delta_{Y_1}(e_y)$$

and the second expression comprises:

$$\delta_{X_1Y_1}(e_x \odot e_y)$$

wherein:

$e_X = (R_X, V_X, E_X)$ is a relation, where $R_X$ is a non-empty set of real attributes, $V_X$ is a non-empty set of virtual attributes, $E_X$, an extension of the relation, also denoted as $ext(e_X)$, is a set of tuples, $X_1 \subseteq R_X$, and $X_2 \subseteq X_1$, $e_Y = (R_Y, V_Y, E_Y)$ is a relation, where $R_Y$ is a non-empty set of real attributes, $V_Y$ is a non-empty set of virtual attributes, $E_Y$, an extension of the relation, also denoted as $ext(e_Y)$, is a set of tuples, $Y_1 \subseteq R_Y$, and $Y_2 \subseteq Y_1$, $\delta_X(r)$ is a distinct projection operation of relation r onto attributes X, and $\odot \in \{\bowtie, \leftarrow, \rightarrow, \leftarrow\rightarrow\}$, wherein $\bowtie$ represents a join operation, $\leftarrow\rightarrow$ represents a full outer join operation, $\leftarrow$ represents a left outer join operation, and $\rightarrow$ represents a right outer join operation.

2. A method of simplifying a query in a computer, the query being performed by the computer to retrieve data from a database stored in a electronic storage device coupled to the computer, the method comprising the steps of:

(a) accepting the query into the computer; and (b) replacing a first expression in the query with a second expression, wherein the first expression comprises:

$$\pi_{X_2}\delta_{X_1}(e_x) \odot \pi_{Y_2}\delta_{Y_1}(e_y)$$

and the second expression comprises:

$$\pi_{X_2Y_2}\delta_{X_1Y_1}(e_x \odot e_y)$$

wherein:

$e_X = (R_X, V_X, E_X)$ is a relation, where $R_X$ is a non-empty set of real attributes, $V_X$ is a non-empty set of virtual attributes, $E_X$, an extension of the relation, also denoted as $ext(e_X)$, is a set of tuples, $X_1 \subseteq R_X$, and $X_2 \subseteq X_1$, $e_Y = (R_Y, V_Y, E_Y)$ is a relation, where $R_Y$ is a non-empty set of real attributes, $V_Y$ is a non-empty set of virtual attributes, $E_Y$, an extension of the relation, also denoted as $ext(e_Y)$, is a set of tuples, $Y_1 \subseteq R_Y$, and $Y_2 \subseteq Y_1$, $\pi_X(r)$ is a projection operation of relation r onto attributes X, $\delta_X(r)$ is a distinct projection operation of relation r onto attributes X, and $\odot \in \{\bowtie, \leftarrow, \rightarrow, \leftarrow\!\!\rightarrow\}$, wherein $\bowtie$ represents a join operation, $\leftarrow\!\!\rightarrow$ represents a full outer join operation, $\leftarrow$ represents a left outer join operation, and $\rightarrow$ represents a right outer join operation.

3. A method of simplifying a query in a computer, the query being performed by the computer to retrieve data from a database stored in a electronic storage device coupled to the computer, the method comprising the steps of:

(a) accepting the query into the computer; and (b) replacing a first expression in the query with a second expression, wherein the first expression comprises:

$$\pi_{x_1}(e_x) \odot \delta_{y_1}(e_y)$$

and the second expression comprises:

$$\pi_{x_1 y_1} \delta_{v_x x_1 y_1}(e_x \odot e_y)$$

wherein:

$e_X = (R_X, V_X, E_X)$ is a relation, where $R_X$ is a non-empty set of real attributes, $V_X$ is a non-empty set of virtual attributes, $E_X$, an extension of the relation, also denoted as $ext(e_X)$, is a set of tuples, and $X_1 \subseteq R_X$, $e_Y = (R_Y, V_Y, E_Y)$ is a relation, where $R_Y$ is a non-empty set of real attributes, $V_Y$ is a non-empty set of virtual attributes, $E_Y$, an extension of the relation, also denoted as $ext(e_Y)$, is a set of tuples, and $Y_1 \subseteq R_Y$, $\pi_X(r)$ is a projection operation of relation r onto attributes X, $\delta_X(r)$ is a distinct projection operation of relation r onto attributes X, and $\odot \in \{\bowtie, \leftarrow, \rightarrow, \leftarrow\!\!\rightarrow\}$, wherein $\bowtie$ represents a join operation, $\leftarrow\!\!\rightarrow$ represents a full outer join operation, $\leftarrow$ represents a left outer join operation, and $\rightarrow$ represents a right outer join operation.

4. A method of simplifying a query in a computer, the query being performed by the computer to retrieve data from a database stored in a electronic storage device coupled to the computer, the method comprising the steps of:

(a) accepting the query into the computer; and (b) replacing a first expression in the query with a second expression, wherein the first expression comprises:

$$\pi_{x_2} \delta_{x_1}(e_x) \odot \pi_{y_1}(e_y)$$

and the second expression comprises:

$$\pi_{x_2 y_1} \delta_{v_y x_1 y_1}(e_x \odot e_y)$$

wherein:

$e_X = (R_X, V_X, E_X)$ is a relation, where $R_X$ is a non-empty set of real attributes, $V_X$ is a non-empty set of virtual attributes, $E_X$, an extension of the relation, also denoted as $ext(e_X)$, is a set of tuples, $X_1 \subseteq R_X$, and $X_2 \subseteq X_1$, $e_Y = (R_Y, V_Y, E_Y)$ is a relation, where $R_Y$ is a non-empty set of real attributes, $V_Y$ is a non-empty set of virtual attributes, $E_Y$, an extension of the relation, also denoted as $ext(e_Y)$, is a set of tuples, and $Y_1 \subseteq R_Y$, $\pi_X(r)$ is a projection operation of relation r onto attributes X, $\delta_X(r)$ is a distinct projection operation of relation r onto attributes X, and $\odot \in \{\bowtie, \leftarrow, \rightarrow, \leftarrow\!\!\rightarrow\}$, wherein $\bowtie$ represents a join operation, $\leftarrow\!\!\rightarrow$ represents a full outer join operation, $\leftarrow$ represents a left outer join operation, and $\rightarrow$ represents a right outer join operation.

5. A method of simplifying a query in a computer, the query being performed by the computer to retrieve data from a database stored in a electronic storage device coupled to the computer, the method comprising the steps of:

(a) accepting the query into the computer; and (b) replacing a first expression in the query with a second expression, wherein the first expression comprises:

$$\pi_{x_2} \delta_{x_1}(e_x) \odot \delta_{y_1}(e_y)$$

and the second expression comprises:

$$\pi_{x_2 y_1} \delta_{x_1 y_1}(e_x \odot e_y)$$

wherein:

$e_X = (R_X, V_X, E_X)$ is a relation, where $R_X$ is a non-empty set of real attributes, $V_X$ is a non-empty set of virtual attributes, $E_X$, an extension of the relation, also denoted as $ext(e_X)$, is a set of tuples, $X_1 \subseteq R_X$, and $X_2 \subseteq X_1$, $e_Y = (R_Y, V_Y, E_Y)$ is a relation, where $R_Y$ is a non-empty set of real attributes, $V_Y$ is a non-empty set of virtual attributes, $E_Y$, an extension of the relation, also denoted as $ext(e_Y)$, is a set of tuples, and $Y_1 \subseteq R_Y$, $\pi_X(r)$ is a projection operation of relation r onto attributes X, $\delta_X(r)$ is a distinct projection operation of relation r onto attributes X, and $\odot \in \{\bowtie, \leftarrow, \rightarrow, \leftarrow\!\!\rightarrow\}$, wherein $\bowtie$ represents a join operation, $\leftarrow\!\!\rightarrow$ represents a full outer join operation, $\leftarrow$ represents a left outer join operation, and $\rightarrow$ represents a right outer join operation.

6. A method of simplifying a query in a computer, the query being performed by the computer to retrieve data from a database stored in a electronic storage device coupled to the computer, the method comprising the steps of:

(a) accepting the query into the computer; and (b) applying an identity to the query, wherein the identity comprises:

$$\delta_{x_1 y_1}\left( e_x \stackrel{p_{xy}}{\underset{\odot}{}} e_y \right) = \delta_{x_1}(e_x) \stackrel{p_{xy}}{\underset{\odot}{}} \delta_{y_1}(e_y)$$

and wherein:

$e_X = (R_X, V_X, E_X)$ is a relation, where $R_X$ is a non-empty set of real attributes, $V_X$ is a non-empty set of virtual attributes, $E_X$, an extension of the relation, also denoted as $ext(e_X)$, is a set of tuples, and $X_1 \subseteq R_X$, $e_Y = (R_Y, V_Y, E_Y)$ is a relation, where $R_Y$ is a non-empty set of real attributes, $V_Y$ is a non-empty set of virtual attributes, $E_Y$, an extension of the relation, also denoted as $ext(e_Y)$, is a set of tuples, and $Y_1 \subseteq R_Y$, $p_{xy}$ is a predicate, $sch(p_{xy})$ is a schema of $p_{xy}$, $(sch(p_{xy}) \cap R_X) \subseteq X_1$, $(sch(p_{xy}) \cap R_Y) \subseteq Y_1$, $\delta_X(r)$ is a distinct projection operation of relation r onto attributes X, and $\odot \in \{\bowtie, \leftarrow, \rightarrow, \leftarrow\!\!\rightarrow\}$, wherein $\bowtie$ represents a join operation, $\leftarrow\!\!\rightarrow$ represents a full outer join operation, $\leftarrow$ represents a left outer join operation, and $\rightarrow$ represents a right outer join operation.

7. An apparatus for simplifying a query in a computer, the query being performed by the computer to retrieve data from a database stored in a electronic storage device coupled to the computer, the apparatus comprising:

(a) a computer;

(b) means for accepting the query into the computer; and (c) means for replacing a first expression in the query with a second expression, wherein the first expression comprises:

$$\delta_{x_1}(e_x) \odot \delta_{y_1}(e_y)$$

and the second expression comprises:

$$\delta_{x_1 y_1}(e_x \odot e_y)$$

wherein:

- $e_x = (R_x, V_x, E_x)$ is a relation, where $R_x$ is a non-empty set of real attributes, $V_x$ is a non-empty set of virtual attributes, $E_x$, an extension of the relation, also denoted as $ext(e_x)$, is a set of tuples, $X_1 \subseteq R_x$, and $X_2 \subseteq X_1$,
- $e_y = (R_y, V_y, E_y)$ is a relation, where $R_y$ is a non-empty set of real attributes, $V_y$ is a non-empty set of virtual attributes, $E_y$, an extension of the relation, also denoted as $ext(e_y)$, is a set of tuples, $Y_1 \subseteq R_y$, and $Y_2 \subseteq Y_1$,
- $\delta_X(r)$ is a distinct projection operation of relation r onto attributes X, and
- $\odot \in \{\bowtie, \leftarrow, \rightarrow, \leftarrow\rightarrow\}$, wherein $\bowtie$ represents a join operation, $\leftarrow\rightarrow$ represents a full outer join operation, $\leftarrow$ represents a left outer join operation, and $\rightarrow$ represents a right outer join operation.

8. An apparatus for simplifying a query in a computer, the query being performed by the computer to retrieve data from a database stored in a electronic storage device coupled to the computer, the apparatus comprising:

(a) a computer;

(b) means for accepting the query into the computer; and (c) means for replacing a first expression in the query with a second expression, wherein the first expression comprises:

$$\pi_{x_2} \delta_{x_1}(e_x) \odot \pi_{y_2} \delta_{y_1}(e_y)$$

and the second expression comprises:

$$\pi_{x_2 y_2} \delta_{x_1 y_1}(e_x \odot e_y)$$

wherein:

- $e_x = (R_x, V_x, E_x)$ is a relation, where $R_x$ is a non-empty set of real attributes, $V_x$ is a non-empty set of virtual attributes, $E_x$, an extension of the relation, also denoted as $ext(e_x)$, is a set of tuples, $X_1 \subseteq R_x$, and $X_2 \subseteq X_1$,
- $e_y = (R_y, V_y, E_y)$ is a relation, where $R_y$ is a non-empty set of real attributes, $V_y$ is a non-empty set of virtual attributes, $E_y$, an extension of the relation, also denoted as $ext(e_y)$, is a set of tuples, $Y_1 \subseteq R_y$, and $Y_2 \subseteq Y_1$,
- $\pi_X(r)$ is a projection operation of relation r onto attributes X,
- $\delta_X(r)$ is a distinct projection operation of relation r onto attributes X, and represents a full outer join operation, $\leftarrow$ represents a left outer join operation, and $\rightarrow$ represents a right outer join operation.

9. An apparatus for simplifying a query in a computer, the query being performed by the computer to retrieve data from a database stored in a electronic storage device coupled to the computer, the apparatus comprising:

(a) a computer;

(b) means for accepting the query into the computer; and (c) means for replacing a first expression in the query with a second expression, wherein the first expression comprises:

$$\pi_{x_1}(e_x) \odot \delta_{y_1}(e_y)$$

and the second expression comprises:

$$\pi_{x_1 y_1} \delta_{v_x, x_1 y_1}(e_x \odot e_y)$$

wherein:

- $e_x = (R_x, V_x, E_x)$ is a relation, where $R_x$ is a non-empty set of real attributes, $V_x$ is a non-empty set of virtual attributes, $E_x$, an extension of the relation, also denoted as $ext(e_x)$, is a set of tuples, and $X_1 \subseteq R_x$,
- $e_y = (R_y, V_y, E_y)$ is a relation, where $R_y$ is a non-empty set of real attributes, $V_y$ is a non-empty set of virtual attributes, $E_y$, an extension of the relation, also denoted as $ext(e_y)$, is a set of tuples, and $Y_1 \subseteq R_y$,
- $\pi_X(r)$ is a projection operation of relation r onto attributes X,
- $\delta_X(r)$ is a distinct projection operation of relation r onto attributes X, and
- $\odot \in \{\bowtie, \leftarrow, \rightarrow, \leftarrow\rightarrow\}$, wherein $\bowtie$ represents a join operation, $\leftarrow\rightarrow$ represents a full outer join operation, $\leftarrow$ represents a left outer join operation, and $\rightarrow$ represents a right outer join operation.

10. An apparatus for simplifying a query in a computer, the query being performed by the computer to retrieve data from a database stored in a electronic storage device coupled to the computer, the apparatus comprising:

(a) a computer;

(b) means for accepting the query into the computer; and (c) means for replacing a first expression in the query with a second expression, wherein the first expression comprises:

$$\pi_{x_2} \delta_{x_1}(e_x) \odot \pi_{y_1}(e_y)$$

and the second expression comprises:

$$\pi_{x_2 y_1} \delta_{v_y, x_1 y_1}(e_x \odot e_y)$$

wherein:

- $e_x = (R_x, V_x, E_x)$ is a relation, where $R_x$ is a non-empty set of real attributes, $V_x$ is a non-empty set of virtual attributes, $E_x$, an extension of the relation, also denoted as $ext(e_x)$, is a set of tuples, and $X_1 \subseteq R_x$, and $X_2 \subseteq X_1$,
- $e_y = (R_y, V_y, E_y)$ is a relation, where $R_y$ is a non-empty set of real attributes, $V_y$ is a non-empty set of virtual attributes, $E_y$, an extension of the relation, also denoted as $ext(e_y)$, is a set of tuples, and $Y_1 \subseteq R_y$,
- $\pi_X(r)$ is a projection operation of relation r onto attributes X,
- $\delta_X(r)$ is a distinct projection operation of relation r onto attributes X, and
- $\odot \in \{\bowtie, \leftarrow, \rightarrow, \leftarrow\rightarrow\}$, wherein $\bowtie$ represents a join operation, $\leftarrow\rightarrow$ represents a full outer join operation, $\leftarrow$ represents a left outer join operation, and $\rightarrow$ represents a right outer join operation.

11. An apparatus for simplifying a query in a computer, the query being performed by the computer to retrieve data from a database stored in a electronic storage device coupled to the computer, the apparatus comprising:

(a) a computer;

(b) means for accepting the query into the computer; and (c) means for replacing a first expression in the query with a second expression, wherein the first expression comprises:

$\pi_{x_2}\delta_{x_1}(e_x)\odot\delta_{Y_1}(e_y)$ and the second expression comprises:

$\pi_{x_2 Y_1}\delta_{x_1 Y_1}(e_x \odot e_y)$ wherein:
- $e_X=(R_X, V_X, E_X)$ is a relation, where $R_X$ is a non-empty set of real attributes, $V_X$ is a non-empty set of virtual attributes, $E_X$, an extension of the relation, also denoted as $\text{ext}(e_X)$, is a set of tuples, and $X_1 \subseteq R_X$, and $X_2 \subseteq X_1$,
- $e_Y=(R_Y, V_Y, E_Y)$ is a relation, where $R_Y$ is a non-empty set of real attributes, $V_Y$ is a non-empty set of virtual attributes, $E_Y$, an extension of the relation, also denoted as $\text{ext}(e_Y)$, is a set of tuples, and $Y_1 \subseteq R_Y$,
- $\pi_X(r)$ is a projection operation of relation r onto attributes X,
- $\delta_X(r)$ is a distinct projection operation of relation r onto attributes X, and
- $\odot \in \{\bowtie, \leftarrow, \rightarrow, \leftrightarrow\}$, wherein $\bowtie$ represents a join operation, $\leftrightarrow$ represents a full outer join operation, $\leftarrow$ represents a left outer join operation, and $\rightarrow$ represents a right outer join operation.

12. An apparatus for simplifying a query in a computer, the query being performed by the computer to retrieve data from a database stored in a electronic storage device coupled to the computer, the apparatus comprising:

(a) a computer;

(b) means for accepting the query into the computer; and (c) means for applying an identity to the query, wherein the identity comprises:

$\delta_{x_1 Y_1}(e_x \odot^{p_{xy}} e_y) = \delta_{x_1}(e_x) \odot^{p_{xy}} \delta_{Y_1}(e_y)$ and wherein:
- $e_X=(R_X, V_X, E_X)$ is a relation, where $R_X$ is a non-empty set of real attributes, $V_X$ is a non-empty set of virtual attributes, $E_X$, an extension of the relation, also denoted as $\text{ext}(e_X)$, is a set of tuples, and $X_1 \subseteq R_X$,
- $e_Y=(R_Y, V_Y, E_Y)$ is a relation, where $R_Y$ is a non-empty set of real attributes, $V_Y$ is a non-empty set of virtual attributes, $E_Y$, an extension of the relation, also denoted as $\text{ext}(e_Y)$, is a set of tuples, and $Y_1 \subseteq R_Y$,
- $p_{xy}$ is a predicate,
- $\text{sch}(p_{xy})$ is a schema of $p_{xy}$,
- $(\text{sch}(p_{xy}) \cap R_X) \subseteq X_1$,
- $(\text{sch}(p_{xy}) \cap R_Y) \subseteq Y_1$,
- $\delta_X(r)$ is a distinct projection operation of relation r onto attributes X, and
- $\odot \in \{\bowtie, \leftarrow, \rightarrow, \leftrightarrow\}$, wherein $\bowtie$ represents a join operation, $\leftrightarrow$ represents a full outer join operation, $\leftarrow$ represents a left outer join operation, and $\rightarrow$ represents a right outer join operation.

13. An article of manufacture comprising a computer program carrier embodying one or more instructions of a method of simplifying a query in a computer, the query being performed by the computer to retrieve data from a database stored in a electronic storage device coupled to the computer, the method comprising the steps of:

(a) accepting the query into the computer; and (b) replacing a first expression in the query with a second expression, wherein the first expression comprises:

$\delta_{x_1}(e_x) \odot \delta_{Y_1}(e_y)$ and the second expression comprises:

$\delta_{x_1 Y_1}(e_x \odot e_y)$ wherein:
- $e_X=(R_X, V_X, E_X)$ is a relation, where $R_X$ is a non-empty set of real attributes, $V_X$ is a non-empty set of virtual attributes, $E_X$, an extension of the relation, also denoted as $\text{ext}(e_X)$, is a set of tuples, and $X_1 \subseteq R_X$, and $X_2 \subseteq X_1$,
- $e_Y=(R_Y, V_Y, E_Y)$ is a relation, where $R_Y$ is a non-empty set of real attributes, $V_Y$ is a non-empty set of virtual attributes, $E_Y$, an extension of the relation, also denoted as $\text{ext}(e_Y)$, is a set of tuples, and $Y_1 \subseteq R_Y$, and $Y_2 \subseteq Y_1$,
- $\delta_X(r)$ is a distinct projection operation of relation r onto attributes X, and
- $\odot \in \{\bowtie, \leftarrow, \rightarrow, \leftrightarrow\}$, wherein $\bowtie$ represents a join operation, $\leftrightarrow$ represents a full outer join operation, $\leftarrow$ represents a left outer join operation, and $\rightarrow$ represents a right outer join operation.

14. An article of manufacture comprising a computer program carrier embodying one or more instructions of a method of simplifying a query in a computer, the query being performed by the computer to retrieve data from a database stored in a electronic storage device coupled to the computer, the method comprising the steps of:

(a) accepting the query into the computer; and (b) replacing a first expression in the query with a second expression, wherein the first expression comprises:

$\pi_{x_2}\delta_{x_1}(e_x) \odot \pi_{Y_2}\delta_{Y_1}(e_y)$ and the second expression comprises:

$\pi_{x_2 Y_2}\delta_{x_1 Y_1}(e_x \odot e_y)$ wherein:
- $e_X=(R_X, V_X, E_X)$ is a relation, where $R_X$ is a non-empty set of real attributes, $V_X$ is a non-empty set of virtual attributes, $E_X$, an extension of the relation, also denoted as $\text{ext}(e_X)$, is a set of tuples, and $X_1 \subseteq R_X$, and $X_2 \subseteq X_1$,
- $e_Y=(R_Y, V_Y, E_Y)$ is a relation, where $R_Y$ is a non-empty set of real attributes, $V_Y$ is a non-empty set of virtual attributes, $E_Y$, an extension of the relation, also denoted as $\text{ext}(e_Y)$, is a set of tuples, and $Y_1 \subseteq R_Y$, and $Y_2 \subseteq Y_1$,
- $\pi_X(r)$ is a projection operation of relation r onto attributes X,
- $\delta_X(r)$ is a distinct projection operation of relation r onto attributes X, and
- $\odot \in \{\bowtie, \leftarrow, \rightarrow, \leftrightarrow\}$, wherein $\bowtie$ represents a join operation, $\leftrightarrow$ represents a full outer join operation, $\leftarrow$ represents a left outer join operation, and $\rightarrow$ represents a right outer join operation.

15. An article of manufacture comprising a computer program carrier embodying one or more instructions of a method of simplifying a query in a computer, the query being performed by the computer to retrieve data from a database stored in a electronic storage device coupled to the computer, the method comprising the steps of:

(a) accepting the query into the computer; and (b) replacing a first expression in the query with a second expression, wherein the first expression comprises:

$\pi_{x_1}(e_x) \odot \delta_{Y_1}(e_y)$ and the second expression comprises:

$$\pi_{X_1Y_1}\delta_{V_xX_1Y_1}(e_x \odot e_y)$$

wherein:
- $e_x = (R_x, V_x, E_x)$ is a relation, where $R_x$ is a non-empty set of real attributes, $V_x$ is a non-empty set of virtual attributes, $E_x$, an extension of the relation, also denoted as $\text{ext}(e_x)$, is a set of tuples, and $X_1 \subseteq R_x$,
- $e_y = (R_y, V_y, E_y)$ is a relation, where $R_y$ is a non-empty set of real attributes, $V_y$ is a non-empty set of virtual attributes, $E_y$, an extension of the relation, also denoted as $\text{ext}(e_y)$, is a set of tuples, and $Y_1 \subseteq R_y$,
- $\pi_X(r)$ is a projection operation of relation r onto attributes X,
- $\delta_X(r)$ is a distinct projection operation of relation r onto attributes X, and
- $\odot \in \{\bowtie, \leftarrow, \rightarrow, \leftrightarrow\}$, wherein $\bowtie$ represents a join operation, $\leftrightarrow$ represents a full outer join operation, $\leftarrow$ represents a left outer join operation, and $\rightarrow$ represents a right outer join operation.

16. An article of manufacture comprising a computer program carrier embodying one or more instructions of a method of simplifying a query in a computer, the query being performed by the computer to retrieve data from a database stored in a electronic storage device coupled to the computer, the method comprising the steps of:

(a) accepting the query into the computer; and
(b) replacing a first expression in the query with a second expression, wherein the first expression comprises:

$$\pi_{X_2}\delta_{X_1}(e_x) \odot \pi_{Y_1}(e_y)$$

and the second expression comprises:

$$\pi_{X_2Y_1}\delta_{V_yX_1Y_1}(e_x \odot e_y)$$

wherein:
- $e_x = (R_x, V_x, E_x)$ is a relation, where $R_x$ is a non-empty set of real attributes, $V_x$ is a non-empty set of virtual attributes, $E_x$, an extension of the relation, also denoted as $\text{ext}(e_x)$, is a set of tuples, and $X_1 \subseteq R_x$, and $X_2 \subseteq X_1$,
- $e_y = (R_y, V_y, E_y)$ is a relation, where $R_y$ is a non-empty set of real attributes, $V_y$ is a non-empty set of virtual attributes, $E_y$, an extension of the relation, also denoted as $\text{ext}(e_y)$, is a set of tuples, and $Y_1 \subseteq R_y$,
- $\pi_X(r)$ is a projection operation of relation r onto attributes X,
- $\delta_X(r)$ is a distinct projection operation of relation r onto attributes X, and
- $\odot \in \{\bowtie, \leftarrow, \rightarrow, \leftrightarrow\}$, wherein $\bowtie$ represents a join operation, $\leftrightarrow$ represents a full outer join operation, $\leftarrow$ represents a left outer join operation, and $\rightarrow$ represents a right outer join operation.

17. An article of manufacture comprising a computer program carrier embodying one or more instructions of a method of simplifying a query in a computer, the query being performed by the computer to retrieve data from a database stored in a electronic storage device coupled to the computer, the method comprising the steps of:

(a) accepting the query into the computer; and
(b) replacing a first expression in the query with a second expression, wherein the first expression comprises:

$$\pi_{X_2}\delta_{X_1}(e_x) \odot \delta_{Y_1}(e_y)$$

and the second expression comprises:

$$\pi_{X_2Y_1}\delta_{X_1Y_1}(e_x \odot e_y)$$

wherein:
- $e_x = (R_x, V_x, E_x)$ is a relation, where $R_x$ is a non-empty set of real attributes, $V_x$ is a non-empty set of virtual attributes, $E_x$, an extension of the relation, also denoted as $\text{ext}(e_x)$, is a set of tuples, and $X_1 \subseteq R_x$, and $X_2 \subseteq X_1$,
- $e_y = (R_y, V_y, E_y)$ is a relation, where $R_y$ is a non-empty set of real attributes, $V_y$ is a non-empty set of virtual attributes, $E_y$, an extension of the relation, also denoted as $\text{ext}(e_y)$, is a set of tuples, and $Y_1 \subseteq R_y$,
- $\pi_X(r)$ is a projection operation of relation r onto attributes X,
- $\delta_X(r)$ is a distinct projection operation of relation r onto attributes X, and
- $\odot \in \{\bowtie, \leftarrow, \rightarrow, \leftrightarrow\}$, wherein $\bowtie$ represents a join operation, $\leftrightarrow$ represents a full outer join operation, $\leftarrow$ represents a left outer join operation, and $\rightarrow$ represents a right outer join operation.

18. An article of manufacture comprising a computer program carrier embodying one or more instructions of a method of simplifying a query in a computer, the query being performed by the computer to retrieve data from a database stored in a electronic storage device coupled to the computer, the method comprising the steps of:

(a) accepting the query into the computer; and
(b) applying an identity to the query, wherein the identity comprises:

$$\delta_{X_1Y_1}(e_x \odot^{p_{xy}} e_y) = \delta_{X_1}(e_x) \odot^{p_{xy}} \delta_{Y_1}(e_y)$$

and wherein:
- $e_x = (R_x, V_x, E_x)$ is a relation, where $R_x$ is a non-empty set of real attributes, $V_x$ is a non-empty set of virtual attributes, $E_x$, an extension of the relation, also denoted as $\text{ext}(e_x)$, is a set of tuples, and $X_1 \subseteq R_x$,
- $e_y = (R_y, V_y, E_y)$ is a relation, where $R_y$ is a non-empty set of real attributes, $V_y$ is a non-empty set of virtual attributes, $E_y$, an extension of the relation, also denoted as $\text{ext}(e_y)$, is a set of tuples, and $Y_1 \subseteq R_y$,
- $p_{xy}$ is a predicate,
- $\text{sch}(p_{xy})$ is a schema of $p_{xy}$,
- $(\text{sch}(p_{xy}) \cap R_x) \subseteq X_1$,
- $(\text{sch}(p_{xy}) \cap R_y) \subseteq Y_1$,
- $\delta_X(r)$ is a distinct projection operation of relation r onto attributes X, and
- $\odot \in \{\bowtie, \leftarrow, \rightarrow, \leftrightarrow\}$, wherein $\bowtie$ represents a join operation, $\leftrightarrow$ represents a full outer join operation, $\leftarrow$ represents a left outer join operation, and $\rightarrow$ represents a right outer join operation.

* * * * *